United States Patent
Kuno

(10) Patent No.: US 7,411,697 B2
(45) Date of Patent: Aug. 12, 2008

(54) COLOR CONVERSION DEVICE

(75) Inventor: Masashi Kuno, Oobu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1033 days.

(21) Appl. No.: 10/430,310

(22) Filed: May 7, 2003

(65) Prior Publication Data

US 2003/0210414 A1 Nov. 13, 2003

(30) Foreign Application Priority Data

May 8, 2002 (JP) ............................. 2002-133002

(51) Int. Cl.
*G06K 15/00* (2006.01)
*G06F 3/08* (2006.01)

(52) U.S. Cl. .................. 358/1.9; 358/523; 358/529

(58) Field of Classification Search .................. 358/1.9, 358/523, 518, 520, 524, 1.16, 529, 1.15, 358/1.1; 382/162, 167

See application file for complete search history.

(56) References Cited

U.S. PATENT DOCUMENTS

| 5,126,838 | A | 6/1992 | Ohsawa et al. | |
| 5,748,858 | A * | 5/1998 | Ohtsuka et al. | 358/1.9 |
| 5,835,624 | A | 11/1998 | Ueda et al. | |
| 6,222,639 | B1 | 4/2001 | Suzuki | |
| 6,341,175 | B1 | 1/2002 | Usami | |
| 6,888,961 | B1 * | 5/2005 | Tamagawa et al. | 382/162 |
| 6,891,649 | B1 * | 5/2005 | Kondo | 358/527 |
| 6,917,445 | B2 * | 7/2005 | Kuno et al. | 358/1.9 |
| 6,927,876 | B1 | 8/2005 | Kondo | |
| 2002/0029715 | A1 * | 3/2002 | Ogatsu et al. | 101/494 |
| 2003/0019381 | A1 * | 1/2003 | Yamamoto | 101/483 |
| 2003/0142110 | A1 * | 7/2003 | Murashita | 345/600 |
| 2004/0119992 | A1 * | 6/2004 | Falk et al. | 358/1.9 |
| 2005/0078122 | A1 * | 4/2005 | Ohga | 345/589 |

FOREIGN PATENT DOCUMENTS

| JP | A 01-200964 | 8/1989 |
| JP | A 9-116776 | 5/1997 |
| JP | A 11-027553 | 1/1999 |
| JP | A 11-146213 | 5/1999 |
| JP | A 2001-119595 | 4/2001 |

OTHER PUBLICATIONS

Fujino, "Image Quality Evaluation of Inkjet Prints", Publication of Society of Photographic Association of Japan, vol. 60, No. 6, pp. 348-352, 1997.

Imakawa, "Image Noise in Color Hard Copies", Symposium of the Institute of Electronics Engineers, Dec. 16, 1996.

* cited by examiner

*Primary Examiner*—Madeleine A Nguyen
(74) *Attorney, Agent, or Firm*—Oliff & Berridge, PLC

(57) ABSTRACT

During the device link processing, an original lookup table LUT0 is modified into a modified lookup table LUT1 so that achromatic color value sets B2a will be associated with all the achromatic color value sets B1a. Accordingly, during a color conversion processing, by using the modified lookup table LUT1, any input achromatic color value set B1 in (0, 0, 0, K1 in ) will be converted into an output achromatic color value set B2 out (0, 0, 0, K2 out). In this way, the black-print image part in the input image that is reproduced by black ink only by printer A1 will be maintained as a black-print image part and printed by a printer A2 by black ink only. Thus, the black-print information of the input image can be maintained through the color conversion processing.

24 Claims, 13 Drawing Sheets

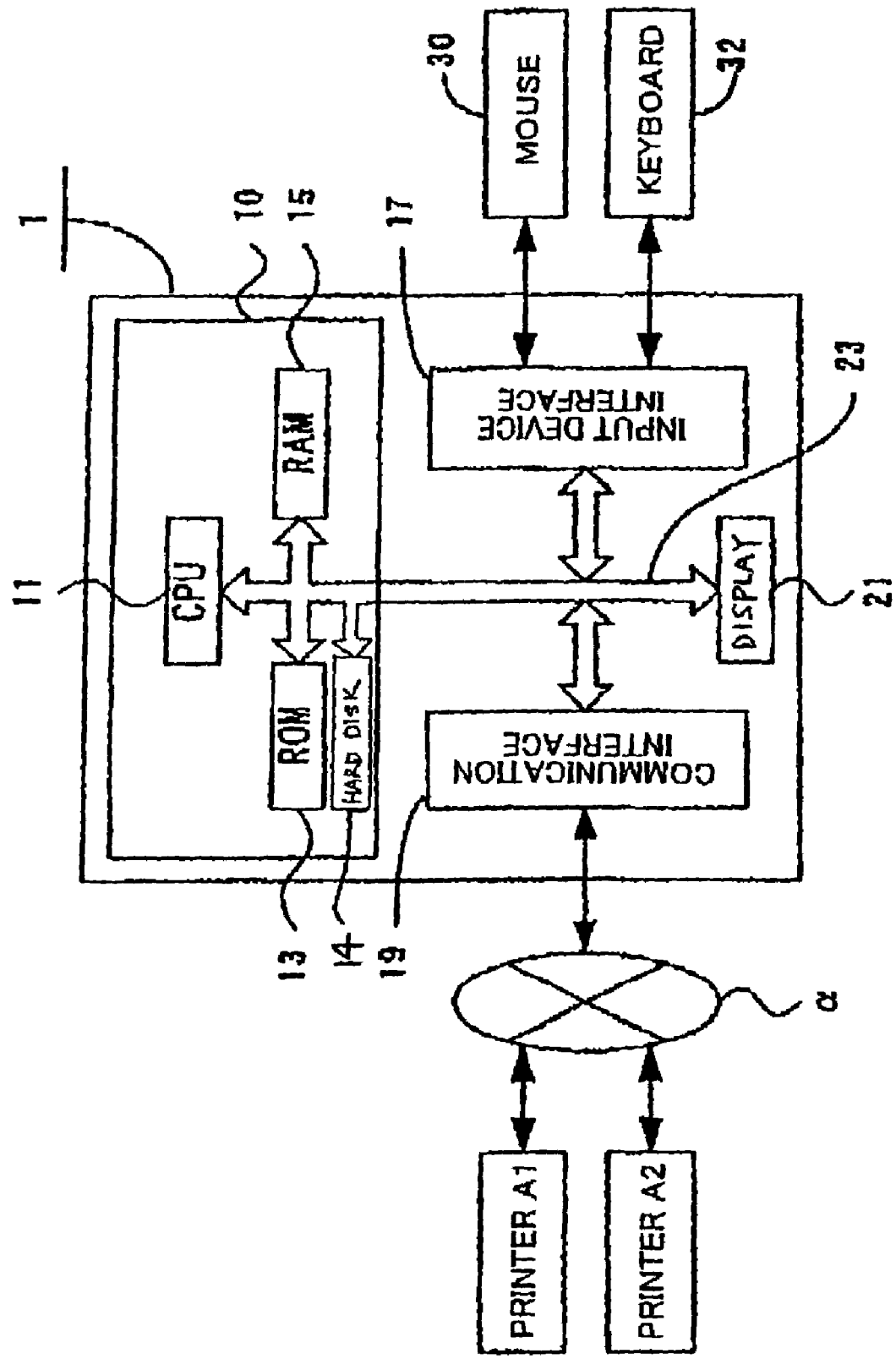

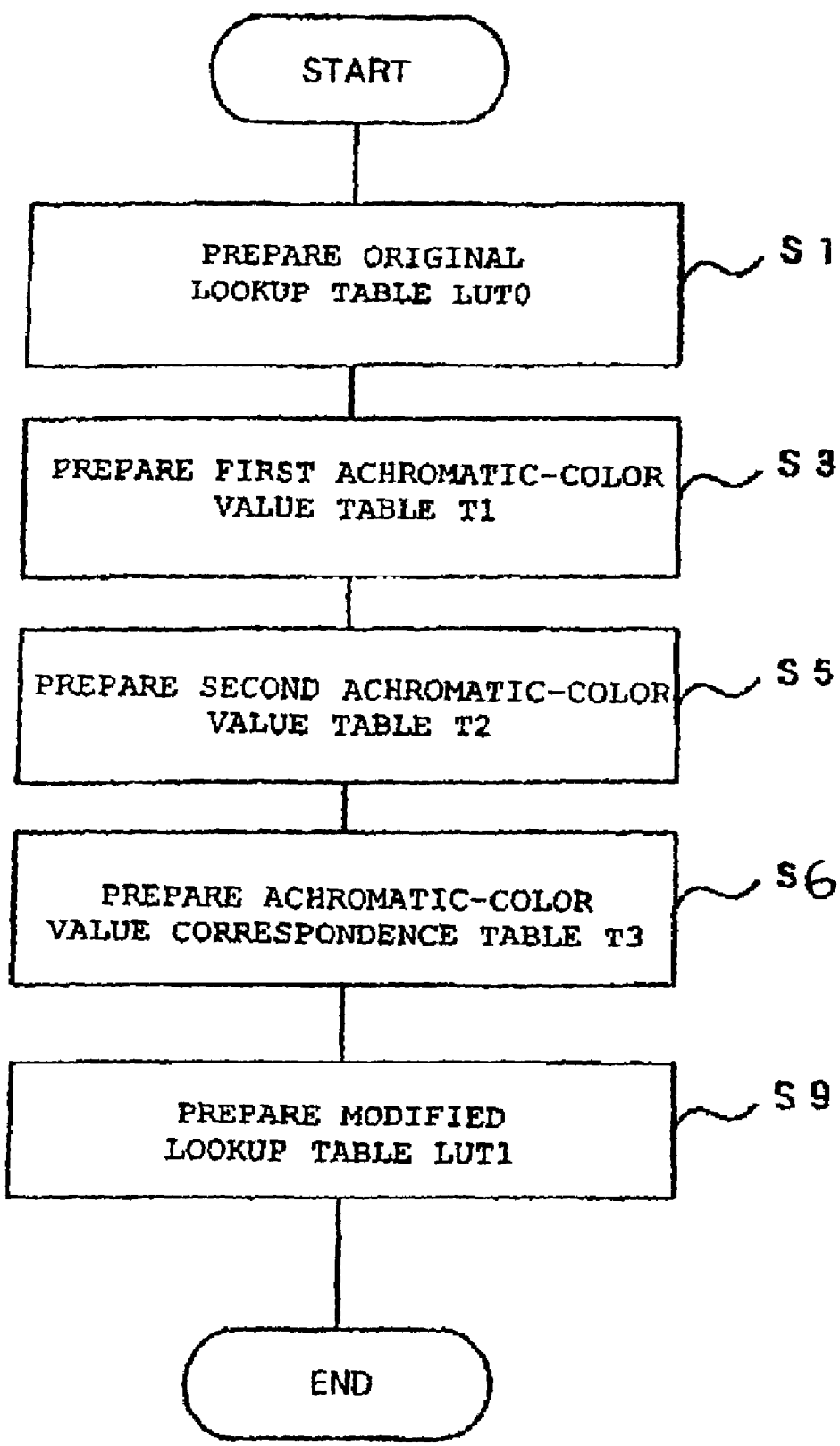

LUT0

| COLOR VALUE SET B1 | | | | COLOR VALUE SET B2 | | | |
|---|---|---|---|---|---|---|---|
| C1 | M1 | Y1 | K1 | C2 | M2 | Y2 | K2 |
| 0 | 0 | 0 | 0 | | | | |
| 4095 | 0 | 0 | 0 | | | | |
| 4095 | 4095 | 0 | 0 | | | | |
| 4095 | 4095 | 4095 | 0 | | | | |
| : | : | : | : | : | : | : | : |
| 65535 | 65535 | 65535 | 0 | | | | |
| 0 | 0 | 0 | 4095 | | | | |
| 4095 | 0 | 0 | 4095 | | | | |
| 4095 | 4095 | 0 | 4095 | | | | |
| 4095 | 4095 | 4095 | 4095 | | | | |
| : | : | : | : | : | : | : | : |
| 65535 | 65535 | 65535 | 4095 | | | | |
| 0 | 0 | 0 | 8191 | | | | |
| 4095 | 0 | 0 | 8191 | | | | |
| 4095 | 4095 | 0 | 8191 | | | | |
| 4095 | 4095 | 4095 | 8191 | | | | |
| : | : | : | : | : | : | : | : |
| 65535 | 65535 | 65535 | 8191 | | | | |
| : | : | : | : | : | : | : | : |
| : | : | : | : | : | : | : | : |
| 0 | 0 | 0 | 61439 | | | | |
| 4095 | 0 | 0 | 61439 | | | | |
| 4095 | 4095 | 0 | 61439 | | | | |
| 4095 | 4095 | 4095 | 61439 | | | | |
| : | : | : | : | : | : | : | : |
| 65535 | 65535 | 65535 | 61439 | | | | |
| 0 | 0 | 0 | 65535 | | | | |
| 4095 | 0 | 0 | 65535 | | | | |
| 4095 | 4095 | 0 | 65535 | | | | |
| 4095 | 4095 | 4095 | 65535 | | | | |
| : | : | : | : | : | : | : | : |
| 65535 | 65535 | 65535 | 65535 | | | | |

FIG.3(b)    T1 ↓

| ACHROMATIC COLOR VALUE SET B1a | | | | STANDARD COLOR VALUE SET D1 | | |
|---|---|---|---|---|---|---|
| C1 | M1 | Y1 | K1 | L | a | b |
| 0 | 0 | 0 | 0 | 65535 | 32896 | 32896 |
| 0 | 0 | 0 | 4095 | 62731 | 32815 | 32815 |
| 0 | 0 | 0 | 8191 | 59927 | 32734 | 32734 |
| 0 | 0 | 0 | 12287 | 57123 | 32654 | 32654 |
| 0 | 0 | 0 | 16383 | 53788 | 32639 | 32639 |
| 0 | 0 | 0 | 20479 | 50330 | 32639 | 32639 |
| 0 | 0 | 0 | 24575 | 46872 | 32639 | 32639 |
| 0 | 0 | 0 | 28671 | 43064 | 32639 | 32639 |
| 0 | 0 | 0 | 32767 | 39046 | 32639 | 32507 |
| 0 | 0 | 0 | 36863 | 35027 | 32639 | 32427 |
| 0 | 0 | 0 | 40959 | 31049 | 32639 | 32417 |
| 0 | 0 | 0 | 45055 | 27125 | 32639 | 32496 |
| 0 | 0 | 0 | 49151 | 23199 | 32639 | 32577 |
| 0 | 0 | 0 | 53247 | 18667 | 32658 | 32658 |
| 0 | 0 | 0 | 57343 | 12313 | 32738 | 32738 |
| 0 | 0 | 0 | 61439 | 5958 | 32819 | 32819 |
| 0 | 0 | 0 | 65535 | 0 | 32896 | 32896 |

| ACHROMATIC COLOR VALUE SET B2a | | | | STANDARD COLOR VALUE SET D2 | | |
|---|---|---|---|---|---|---|
| C2 | M2 | Y2 | K2 | L | a | b |
| 0 | 0 | 0 | 0 | 65535 | 32896 | 32896 |
| 0 | 0 | 0 | 1 | 65534 | 32896 | 32896 |
| 0 | 0 | 0 | 2 | 65533 | 32896 | 32896 |
| ⋮ | ⋮ | ⋮ | ⋮ | ⋮ | ⋮ | ⋮ |
| 0 | 0 | 0 | 65533 | 43064 | 32639 | 32639 |
| 0 | 0 | 0 | 65534 | 39046 | 32639 | 32507 |
| 0 | 0 | 0 | 65535 | 35027 | 32639 | 32427 |

FIG. 3(d)

| ACHROMATIC COLOR VALUE SET B1a | | | | ACHROMATIC COLOR VALUE SET B2a | | | | T3 |
|---|---|---|---|---|---|---|---|---|
| C1 | M1 | Y1 | K1 | C2 | M2 | Y2 | K2 | |
| 0 | 0 | 0 | 0 | 0 | 0 | 0 | 0 | |
| 0 | 0 | 0 | 4095 | 0 | 0 | 0 | 2154 | |
| 0 | 0 | 0 | 8191 | 0 | 0 | 0 | 4307 | |
| 0 | 0 | 0 | 12287 | 0 | 0 | 0 | 6460 | |
| 0 | 0 | 0 | 16383 | 0 | 0 | 0 | 9021 | |
| 0 | 0 | 0 | 20479 | 0 | 0 | 0 | 11675 | |
| 0 | 0 | 0 | 24575 | 0 | 0 | 0 | 14791 | |
| 0 | 0 | 0 | 28671 | 0 | 0 | 0 | 18482 | |
| 0 | 0 | 0 | 32767 | 0 | 0 | 0 | 22467 | |
| 0 | 0 | 0 | 36863 | 0 | 0 | 0 | 26406 | |
| 0 | 0 | 0 | 40959 | 0 | 0 | 0 | 30229 | |
| 0 | 0 | 0 | 45055 | 0 | 0 | 0 | 33965 | |
| 0 | 0 | 0 | 49151 | 0 | 0 | 0 | 37904 | |
| 0 | 0 | 0 | 53247 | 0 | 0 | 0 | 44260 | |
| 0 | 0 | 0 | 57343 | 0 | 0 | 0 | 53754 | |
| 0 | 0 | 0 | 61439 | 0 | 0 | 0 | 59631 | |
| 0 | 0 | 0 | 65535 | 0 | 0 | 0 | 65535 | |

FIG. 3(e)

LUT1

| COLOR VALUE SET B1 | | | | COLOR VALUE SET B2 | | | |
| --- | --- | --- | --- | --- | --- | --- | --- |
| C1 | M1 | Y1 | K1 | C2 | M2 | Y2 | K2 |
| 0 | 0 | 0 | 0 | 0 | 0 | 0 | 0 |
| 4095 | 0 | 0 | 0 | | | | |
| 4095 | 4095 | 0 | 0 | | | | |
| 4095 | 4095 | 4095 | 0 | | | | |
| : | : | : | : | : | : | : | : |
| 65535 | 65535 | 65535 | 0 | | | | |
| 0 | 0 | 0 | 4095 | 0 | 0 | 0 | 2154 |
| 4095 | 0 | 0 | 4095 | | | | |
| 4095 | 4095 | 0 | 4095 | | | | |
| 4095 | 4095 | 4095 | 4095 | | | | |
| : | : | : | : | : | : | : | : |
| 65535 | 65535 | 65535 | 4095 | | | | |
| 0 | 0 | 0 | 8191 | 0 | 0 | 0 | 4307 |
| 4095 | 0 | 0 | 8191 | | | | |
| 4095 | 4095 | 0 | 8191 | | | | |
| 4095 | 4095 | 4095 | 8191 | | | | |
| : | : | : | : | : | : | : | : |
| 65535 | 65535 | 65535 | 8191 | | | | |
| : | : | : | : | : | : | : | : |
| 0 | 0 | 0 | 61439 | 0 | 0 | 0 | 59631 |
| 4095 | 0 | 0 | 61439 | | | | |
| 4095 | 4095 | 0 | 61439 | | | | |
| 4095 | 4095 | 4095 | 61439 | | | | |
| : | : | : | : | : | : | : | : |
| 65535 | 65535 | 65535 | 61439 | | | | |
| 0 | 0 | 0 | 65535 | 0 | 0 | 0 | 65535 |
| 4095 | 0 | 0 | 65535 | | | | |
| 4095 | 4095 | 0 | 65535 | | | | |
| 4095 | 4095 | 4095 | 65535 | | | | |
| : | : | : | : | : | : | : | : |
| 65535 | 65535 | 65535 | 65535 | | | | |

PRINT DATA FOR PRINTING PACHES
C = 1, 2, 3, 4, ⋯, 254, 255
M = 1, 2, 3, 4, ⋯, 254, 255
Y = 1, 2, 3, 4, ⋯, 254, 255
K = 1, 1, 1, 1, ⋯, 1, 1

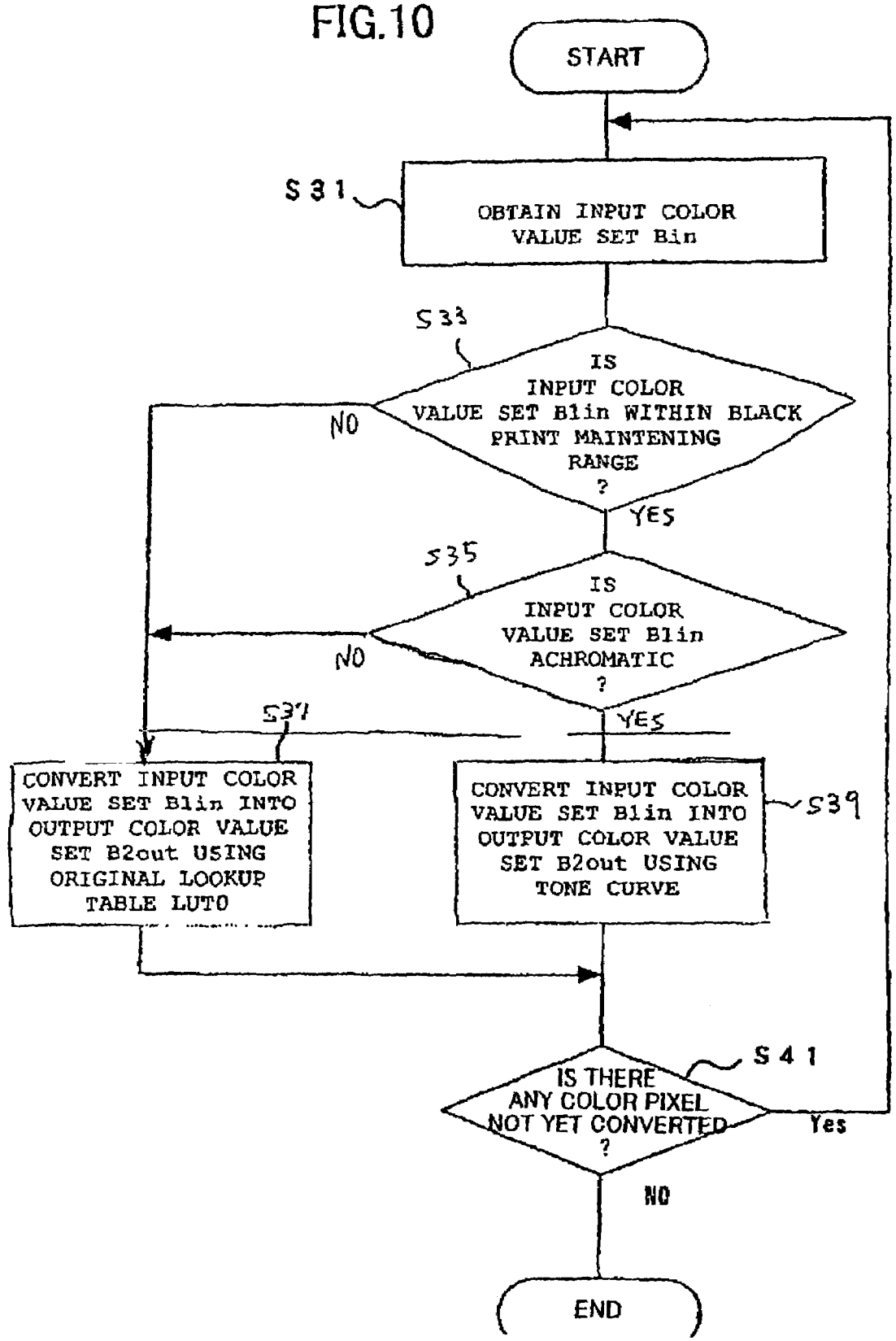

COLOR CONVERSION DEVICE

BACKGROUND OF THE INVENTION

1. Field of the Invention

The present invention relates to a color conversion device.

2. Description of Related Art

Conventionally, a color printer is provided with four cartridges that store inks of colors of cyan (C), magenta (M), yellow (Y), and black (K), respectively. In order to form a multi-color image on a recording paper, the color printer forms images of the respective colors of C, M, Y, and M and by superimposing the four single-color images on top of one another.

The color printer receives a CMYK color value set (C, M, Y, K), which is constituted by cyan, magenta, yellow, and black control signals C, M, Y, K. Each control signal has a value representative of 256 gradations from 0 to 255 for a corresponding color. For example, a CMYK color value set (0, 0, 100, 0) indicates light yellow, while another CMYK color value set of (0, 0, 200, 0) indicates thick or dark yellow. The color printer reproduces multiple tones for each color by adjusting the amount of the corresponding ink according to the CMYK color value set (C, M, Y, K).

Incidentally, coloring degrees of inks used in different color printers are different from one another. Accordingly, even if the same color value set (C, M, Y, K) is used in two different devices A1 and A2, colors reproduced by the devices A1 and A2 will be different from each other. Therefore, when device A1 is controlled by some color value set (C1, M1, Y1, K1) to produce some image and when it is intended to control the device A2 to form the same image, a color conversion device has to convert the color value set (C1, M1, Y1, K1) into another color value set (C2, M2, Y2, K2) that can control the device A2 to reproduce the same image.

In order to convert the color value set (C1, M1, Y1, K1) into the color value set (C2, M2, Y2, K2), according to an ICC (International Color Consortium) color management, the color conversion device first converts the color value set (C1, M1, Y1, K1) into a standard color value set (L, a, b) or (X, Y, Z) by using an ICC profile for the device A1. The standard color value set (L, a, b) or (X, Y, Z) is defined by the CIE (Commission Internationale de l'Eclairage). The color conversion device then converts the standard color value set (L, a, b) or (X, Y, Z) into the color value set (C2, M2, Y2, K2) by using another ICC profile that is for the device A2. Each ICC profile includes data indicative of a correspondence between a plurality of representative color value sets (C, M, Y, K) used in the corresponding device and a plurality of representative standard color value sets (L, a, b) or (X, Y, Z). Each ICC profile is prepared in a file format that is set by the ICC.

SUMMARY OF THE INVENTION

It, however, takes a long period of time to convert the color value set (C1, M1, Y1, K1) into the color value set (C2, M2, Y2, K2) because it is necessary to perform two conversion operations.

It is therefore conceivable to prepare a device link profile for linking the devices A1 and A2 directly with each other. The device link profile may include a lookup table, in which several color value sets (C1, M1, Y1, K1) extracted from the ICC profile for the device A1 and several color value sets (C2, M2, Y2, K2) extracted from the ICC profile for the device A2 are directly associated with each other as reproducing the same colors. The device link profile is prepared also in the file format set by the ICC. The color conversion device can convert a color value set (C1, M1, Y1, K1) for the device A1 into a color value set (C2, M2, Y2, K2) for the device A2 directly by using the device link profile and by executing an interpolation calculation.

It is noted that the inks used in the devices A1 and A2 have different coloring characteristics from each other. Accordingly, the color value sets (C1, M1, Y1, K1) and (C2, M2, Y2, K2), which are interrelated with each other by the device link profile as reproducing the same color, have generally different values from each other.

Even if some color value set (C1, M1, Y1, K1) is a black-print color pixel (0, 0, 0, K) whose chromatic control signals C, M, and K have all the zero values, the device link profile converts this black-print color pixel (0, 0, 0, K) into a chromatic color pixel (C, M, Y, K'), whose chromatic control signals C, M, and Y have values greater than zero.

An input image has sometimes a black-print image part, such as black characters superimposed on a background image part. The black-print part has a black-print color pixel (0, 0, 0, K) which is printed by the device A1 by using black ink only. However, the black pixel (0, 0, 0, K) is converted into a chromatic pixel (C, M, Y, K'). Accordingly, the black-print part will be reproduced by the device A2 by erroneously using the mixture of the cyan, magenta, and yellow inks. As a result, the black-print part will have a degraded appearance. That is, the black characters look thick. Ink bleeding occurs. Chromatic colors appear in an edge part of the black characters. The black characters have low gray balance, and become reddish, for example.

It is therefore conceivable that the color conversion device would judge whether or not an input color value set indicates a 100% solid black. When the input color value set represents the 100% solid black, the input color value set is converted into a black color value set. It is possible to reproduce black characters satisfactorily.

However, an input image sometimes has an achromatic dark-gradation part that leads to a 100% solid black portion. In such a case, according to the above-described conceivable method, the 100% solid black portion is reproduced by black ink only, but pixels in the achromatic dark-gradation part will be reproduced by using the chromatic inks. Accordingly, the color state suddenly changes between the achromatic dark gradation part and the 100% solid black portion. Ink bleeding will possibly occur in the vicinity of the black 100% area. Coloring will possibly occur in an edge part of the black 100% area.

It is noted that the ICC color management defines color conversion characteristics of respective devices using the profiles. Accordingly, the ICC color management allows end-product users to combine products by various companies freely, while attaining an appropriate color reproduction. The ICC color management defines colors in a three-dimensional color space, such as CIE L*a*b* color space, by using a colorimetric method to attain color matching. The ICC color management cannot satisfactorily adapt itself to the four-dimensional CMYK color space, which is used by the traditional printing field to discriminate between black and the mixture of cyan, magenta, and yellow. The ICC color management may not discriminate between black and the mixture of cyan, magenta, and yellow colors properly. Considering this problem, it is conceivable to provide a special color conversion module that can maintain black print information of the entire black-print area without using the ICC profiles. A conceivable color conversion device is therefore provided with both of the special color conversion module and a normal color conversion module that executes color conversion by using the device link profile. The conceivable color conversion device uses a selected one of the special color conversion module and the normal color conversion module. However, this conceivable color conversion device has to store a great amount of data for both modules, and has a complicated configuration to execute a problematic switching operation. It is therefore desirable that the color conversion device would maintain the black-print information while attaining the normal color conversion based on the ICC-based device link profile.

In view of the above-described drawbacks, it is an objective of the present invention to provide an improved color conversion device that has a simple configuration but that can properly maintain black-print information while improving the achromatic gradation.

In order to attain the above and other objects, the present invention provides a color conversion device for converting an input color value set B1in to be used for controlling a device A1 into an output color value set B2out to be used for controlling another device A2, the color conversion device comprising: a profile-storing portion storing profile data PF1 for a device A1 and profile data PF2 for another device A2; an original lookup table creating portion creating an original lookup table T0 by determining color value sets D1 for a plurality of first color value sets B1 based on the profile data PF1, determining second color value sets B2 for the plurality of standard color value sets D1 based on the profile data PF2, and setting correspondences between the plurality of first color value sets B1 and the plurality of second color value sets B2, each first color value set B1 including one achromatic control signal of a value for controlling the device A1 to use one achromatic color with a corresponding amount and at least one chromatic control signal of a value for controlling the device A1 to use at least one chromatic color with a corresponding amount, each second color value set B2 including one achromatic control signal of a value for controlling the device A2 to use one achromatic color with a corresponding amount and at least one chromatic control signal of a value for controlling the device A2 to use at least one chromatic color with a corresponding amount, the plurality of first color value sets B1 including several first achromatic color value sets B1a, all of the at least one chromatic control signal in each first achromatic color value set B1a having a value of zero to control the device A1 to fail to use the at least one chromatic color; a first achromatic-color value table creating portion creating a first achromatic-color value table T1 by determining standard color value sets D1 for the several first achromatic color value sets B1a based on the profile data PF1 and setting correspondences between the first achromatic color value sets B1 and the standard color value sets D1; a second achromatic-color value table creating portion creating a second achromatic-color value table T1 by determining standard color value sets D2 for a plurality of second achromatic color value sets B2a based on the profile data PF2 and setting correspondences between the second achromatic color value sets B2 and the standard color value sets D2, all the at least one chromatic control signal constituting in each second achromatic color value set B2a having a value of zero to control the device A2 to fail to use the at least one chromatic color; an achromatic-color value correspondence table preparing unit preparing an achromatic-color value correspondence table T3 by extracting, for each first achromatic color value set B1a in the first achromatic-color value table T1, one second achromatic color value set B2a from the second achromatic-color value table T2, and setting a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2; an input portion receiving an input color value set B1in to be used for controlling the device A1, the input color value set B1in including one achromatic control signal of a value for controlling the device A1 to use one achromatic color with a corresponding amount and at least one chromatic control signal of a value for controlling the device A1 to use at least one chromatic color with a corresponding amount; and a color conversion portion converting the input color value set B1in into an output color value set B2out by using the original lookup table T0 and the achromatic-color value correspondence table T3, the output color value set B2out being used for controlling the device A2, the output color value set B2out including one achromatic control signal of a value for controlling the device A2 to use one achromatic color with a corresponding amount and at least one chromatic control signal of a value for controlling the device A2 to use at least one chromatic color with a corresponding amount.

According to another aspect, the present invention provides a table creating device for creating an achromatic color conversion table for converting an input achromatic color value set B1in, to be used for controlling a device A1 to reproduce an achromatic color, into an output achromatic color value set B2out to be used for controlling another device A2 to reproduce substantially the same achromatic color, the table creating device comprising: a first achromatic-color value table creating portion creating a first achromatic-color value table T1 by determining standard color value sets D1 for several first achromatic color value sets B1a, and determining a correspondence between the first achromatic color value sets B1a and the standard color value sets D1, each first achromatic color value set B1a including one achromatic control signal of a value for controlling the device A1 to use one achromatic color with a corresponding amount and a chromatic control signal of a value of zero for controlling the device A1 to fail to use the chromatic color; a second achromatic-color value table creating portion creating a second achromatic-color value table T2 by determining standard color value sets D1 for a plurality of second achromatic color value sets B2a, and determining a correspondence between the second achromatic color value sets B2a and the standard color value sets D2, each second achromatic color value set B2a including one achromatic control signal of a value for controlling the device A2 to use one achromatic color with a corresponding amount and a chromatic control signal of a value of zero for controlling the device A2 to fail to use the chromatic color; an achromatic color conversion table preparing unit preparing an achromatic color conversion table T3 by extracting, for each first achromatic color value set B1a in the first achromatic-color value table T1, one second achromatic color value set B2a from the second achromatic-color value table T2, and determining a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2; and a recording portion recording at least a part of the achromatic color conversion table in a memory.

According to still another aspect, the present invention provides a color conversion device for converting an input color value set B1in, to be used for controlling a device A1, into an output color value set B2out to be used for controlling another device A2, the color conversion device comprising: an input portion receiving an input color value set B1in to be used for controlling the device A1 to reproduce a color, the input color value set B1in including one achromatic control signal of a value for controlling the device A1 to use one achromatic color with a corresponding amount and at least one chromatic control signal of a value for controlling the device A1 to use at least one chromatic color with a corresponding amount, a predetermined achromatic range extending from a predetermined maximum value for the achromatic control signals of the input color value sets B1in receivable by the input portion to a threshold smaller than the predetermined maximum value by such an amount that the input portion is capable of receiving at least two range-falling achromatic color value sets whose constituent chromatic control signals have values of zero and whose constituent achromatic control signals have two successive values within the predetermined achromatic range; and a color conversion portion converting the input color value set B1in into an output color value set B2out to be used for controlling another device A2 to reproduce substantially the same color as reproduced by the device A1 by the input color value set B1in, the output color value set B2out including one achromatic control signal of a value for controlling the device A2 to use one achromatic color with a corresponding amount and at least one chromatic control signal of a value for controlling the device A2 to use at least one chromatic color with a corresponding amount, the color conversion portion including an achromatic conversion portion converting each range-falling achromatic color value set B1in into an achromatic color value set B2out whose constituent at least one chromatic control signal has a value of zero.

According to another aspect, the present invention provides a color conversion program for converting an input color value set B1in to be used for controlling a device A1 into an output color value set B2out to be used for controlling another device A2, the color conversion program comprising: an original lookup table creating program creating an original lookup table T0 by determining color value sets D1 for a plurality of first color value sets B1 based on profile data PF1 for a device A1, determining second color value sets B2 for the plurality of standard color value sets D1 based on profile data PF2 for another device A2, and setting correspondences between the plurality of first color value sets B1 and the plurality of second color value sets B2, each first color value set B1 including one achromatic control signal of a value for controlling the device A1 to use one achromatic color with a corresponding amount and at least one chromatic control signal of a value for controlling the device A1 to use at least one chromatic color with a corresponding amount, each second color value set B2 including one achromatic control signal of a value for controlling the device A2 to use one achromatic color with a corresponding amount and at least one chromatic control signal of a value for controlling the device A2 to use at least one chromatic color with a corresponding amount, the plurality of first color value sets B1 including several first achromatic color value sets B1a, all of the at least one chromatic control signal in each first achromatic color value set B1a having a value of zero to control the device A1 to fail to use the at least one chromatic color; a first achromatic-color value table creating program creating a first achromatic-color value table T1 by determining standard color value sets D1 for the several first achromatic color value sets B1a based on the profile data PF1 and setting correspondences between the first achromatic color value sets B1 and the standard color value sets D1; a second achromatic-color value table creating program creating a second achromatic-color value table T1 by determining standard color value sets D2 for a plurality of second achromatic color value sets B2a based on the profile data PF2 and setting correspondences between the second achromatic color value sets B2 and the standard color value sets D2, all the at least one chromatic control signal constituting in each second achromatic color value set B2a having a value of zero to control the device A2 to fail to use the at least one chromatic color; an achromatic-color value correspondence table preparing program preparing an achromatic-color value correspondence table T3 by extracting, for each first achromatic color value set B1a in the first achromatic-color value table T1, one second achromatic color value set B2a from the second achromatic-color value table T2, and setting a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2; an input program receiving an input color value set B1in to be used for controlling the device A1, the input color value set B1in including one achromatic control signal of a value for controlling the device A1 to use one achromatic color with a corresponding amount and at least one chromatic control signal of a value for controlling the device A1 to use at least one chromatic color with a corresponding amount; and a color conversion program converting the input color value set B1in into an output color value set B2out by using the original lookup table T0 and the achromatic-color value correspondence table T3, the output color value set B2out being used for controlling the device A2, the output color value set B2out including one achromatic control signal of a value for controlling the device A2 to use one achromatic color with a corresponding amount and at least one chromatic control signal of a value for controlling the device A2 to use at least one chromatic color with a corresponding amount.

According to a further aspect, the present invention provides a table creating program for creating an achromatic color conversion table for converting an input achromatic color value set B1a in, to be used for controlling a device A1 to reproduce an achromatic color, into an output achromatic color value set B2out to be used for controlling another device A2 to reproduce substantially the same achromatic color, the table creating program comprising: a first achromatic-color value table creating program creating a first achromatic-color value table T1 by determining standard color value sets D1 for several first achromatic color value sets B1a, and determining a correspondence between the first achromatic color value sets B1a and the standard color value sets D1, each first achromatic color value set B1a including one achromatic control signal of a value for controlling the device A1 to use one achromatic color with a corresponding amount and a chromatic control signal of a value of zero for controlling the device A1 to fail to use the chromatic color; a second achromatic-color value table creating program creating a second achromatic-color value table T2 by determining standard color value sets D1 for a plurality of second achromatic color value sets B2a, and determining a correspondence between the second achromatic color value sets B2a and the standard color value sets D2, each second achromatic color value set B2a including one achromatic control signal of a value for controlling the device A2 to use one achromatic color with a corresponding amount and a chromatic control signal of a value of zero for controlling the device A2 to fail to use the chromatic color; an achromatic color conversion table preparing program preparing an achromatic color conversion table T3 by extracting, for each first achromatic color value set B1a in the first achromatic-color value table T1, one second achromatic color value set B2a from the second achromatic-color value table T2, and determining a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2; and a recording program recording at least a part of the achromatic color conversion table in a memory.

According to another aspect, the present invention provides a color conversion program for converting an input color value set B1in, to be used for controlling a device A1, into an output color value set B2out to be used for controlling another device A2, the color conversion program comprising: an input program receiving an input color value set B1in to be used for controlling the device A1 to reproduce a color, the input color value set B1in including one achromatic control signal of a value for controlling the device A1 to use one achromatic color with a corresponding amount and at least one chromatic control signal of a value for controlling the device A1 to use at least one chromatic color with a corresponding amount, a predetermined achromatic range extending from a predetermined maximum value for the achromatic control signals of the input color value sets B1in receivable by the input program to a threshold smaller than the predetermined maximum value by such an amount that the input program is capable of receiving at least two range-falling achromatic color value sets whose constituent chromatic control signals have values of zero and whose constituent achromatic control signals have two successive values within the predetermined achromatic range; and a color conversion program converting the input color value set B1in into an output color value set B2out to be used for controlling another device A2 to reproduce substantially the same color as reproduced by the device A1 by the input color value set B1in, the output color value set B2out including one achromatic control signal of a value for controlling the device A2 to use one achromatic color with a corresponding amount and at least one chromatic control signal of a value for controlling the device A2 to use at least one chromatic color with a corresponding amount, the color conversion program including an achromatic conversion program converting each range-falling achromatic color value set B1in into an achromatic color value set B2out whose constituent at least one chromatic control signal has a value of zero.

According to another aspect, the present invention provides a storage medium storing a color conversion program for converting an input color value set B1in to be used for controlling a device A1 into an output color value set B2out to be used for controlling another device A2, the color conversion program comprising: an original lookup table creating program creating an original lookup table T0 by determining color value sets D1 for a plurality of first color value sets B1 based on profile data PF1 for a device A1, determining second color value sets B2 for the plurality of standard color value sets D1 based on profile data PF2 for another device A2, and setting correspondences between the plurality of first color value sets B1 and the plurality of second color value sets B2, each first color value set B1 including one achromatic control signal of a value for controlling the device A1 to use one achromatic color with a corresponding amount and at least one chromatic control signal of a value for controlling the device A1 to use at least one chromatic color with a corresponding amount, each second color value set B2 including one achromatic control signal of a value for controlling the device A2 to use one achromatic color with a corresponding amount and at least one chromatic control signal of a value for controlling the device A2 to use at least one chromatic color with a corresponding amount, the plurality of first color value sets B1 including several first achromatic color value sets B1a, all of the at least one chromatic control signal in each first achromatic color value set B1a having a value of zero to control the device A1 to fail to use the at least one chromatic color; a first achromatic-color value table creating program creating a first achromatic-color value table T1 by determining standard color value sets D1 for the several first achromatic color value sets B1a based on the profile data PF1 and setting correspondences between the first achromatic color value sets B1 and the standard color value sets D1; a second achromatic-color value table creating program creating a second achromatic-color value table T1 by determining standard color value sets D2 for a plurality of second achromatic color value sets B2a based on the profile data PF2 and setting correspondences between the second achromatic color value sets B2 and the standard color value sets D2, all the at least one chromatic control signal constituting in each second achromatic color value set B2a having a value of zero to control the device A2 to fail to use the at least one chromatic color; an achromatic-color value correspondence table preparing program preparing an achromatic-color value correspondence table T3 by extracting, for each first achromatic color value set B1a in the first achromatic-color value table T1, one second achromatic color value set B2a from the second achromatic-color value table T2, and setting a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2; an input program receiving an input color value set B1in to be used for controlling the device A1, the input color value set B1in including one achromatic control signal of a value for controlling the device A1 to use one achromatic color with a corresponding amount and at least one chromatic control signal of a value for controlling the device A1 to use at least one chromatic color with a corresponding amount; and a color conversion program converting the input color value set B1in into an output color value set B2out by using the original lookup table T0 and the achromatic-color value correspondence table T3, the output color value set B2out being used for controlling the device A2, the output color value set B2out including one achromatic control signal of a value for controlling the device A2 to use one achromatic color with a corresponding amount and at least one chromatic control signal of a value for controlling the device A2 to use at least one chromatic color with a corresponding amount.

According to another aspect, the present invention provides a storage medium storing a table creating program for creating an achromatic color conversion table for converting an input achromatic color value set B1a in, to be used for controlling a device A1 to reproduce an achromatic color, into an output achromatic color value set B2out to be used for controlling another device A2 to reproduce substantially the same achromatic color, the table creating program comprising: a first achromatic-color value table creating program creating a first achromatic-color value table T1 by determining standard color value sets D1 for several first achromatic color value sets B1a, and determining a correspondence between the first achromatic color value sets B1a and the standard color value sets D1, each first achromatic color value set B1a including one achromatic control signal of a value for controlling the device A1 to use one achromatic color with a corresponding amount and a chromatic control signal of a value of zero for controlling the device A1 to fail to use the chromatic color; a second achromatic-color value table creating program creating a second achromatic-color value table T2 by determining standard color value sets D1 for a plurality of second achromatic color value sets B2a, and determining a correspondence between the second achromatic color value sets B2a and the standard color value sets D2, each second achromatic color value set B2a including one achromatic control signal of a value for controlling the device A2 to use one achromatic color with a corresponding amount and a chromatic control signal of a value of zero for controlling the device A2 to fail to use the chromatic color; an achromatic color conversion table preparing program preparing an achromatic color conversion table T3 by extracting, for each first achromatic color value set B1a in the first achromatic-color value table T1, one second achromatic color value set B2a from the second achromatic-color value table T2, and determining a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2; and a recording program recording at least a part of the achromatic color conversion table in a memory.

According to another aspect, the present invention provides a storage medium storing a color conversion program for converting an input color value set B1in, to be used for controlling a device A1, into an output color value set B2out to be used for controlling another device A2, the color conversion program comprising: an input program receiving an input color value set B1in to be used for controlling the device A1 to reproduce a color, the input color value set B1in including one achromatic control signal of a value for controlling the device A1 to use one achromatic color with a corresponding amount and at least one chromatic control signal of a value for controlling the device A1 to use at least one chromatic color with a corresponding amount, a predetermined achromatic range extending from a predetermined maximum value for the achromatic control signals of the input color value sets B1in receivable by the input program to a threshold smaller than the predetermined maximum value by such an amount that the input program is capable of receiving at least two range-falling achromatic color value sets whose constituent chromatic control signals have values of zero and whose constituent achromatic control signals have two successive values within the predetermined achromatic range; and a color conversion program converting the input color value set B1in into an output color value set B2out to be used for controlling another device A2 to reproduce substantially the same color as reproduced by the device A1 by the input color value set B1in, the output color value set B2out including one achromatic control signal of a value for controlling the device A2 to use one achromatic color with a corresponding amount and at least one chromatic control signal of a value for controlling the device A2 to use at least one chromatic color with a corresponding amount, the color conversion program including an achromatic conversion program converting each range-falling achromatic color value set B1in into an achromatic color value set B2out whose constituent at least one chromatic control signal has a value of zero.

According to still another aspect, the present invention provides a table for being used for converting an input color value set, to be used for controlling a device A1 to reproduce a color, into an output color value set to be used for controlling another device A2 to reproduce substantially the same color, the table comprising: data of a plurality of first color value sets B1 to be used for controlling a device A1 to reproduce a plurality of colors, each first color value set B1 including one achromatic control signal of a value for controlling the device A1 to use one achromatic color with a corresponding amount and at least one chromatic control signal of a value for controlling the device A1 to use at least one chromatic color with a corresponding amount, the plurality of first color value sets B1 including several first achromatic color value sets B1a, all of the at least one chromatic control signal in each first achromatic color value set B1a having a value of zero to control the device A1 to fail to use the at least one chromatic color, the several first achromatic color value sets B1a including at least two successive range-falling achromatic color value sets B1a, whose achromatic control signals have two successive values falling in an achromatic range that extends from a predetermined maximum value for the achromatic control signals to a threshold that is smaller than the predetermined maximum value, the values of the achromatic control signals in the at least two successive achromatic color value sets B1abeing greater than or equal to the threshold and smaller than or equal to the maximum value; and data of a plurality of second color value sets B2 to be used for controlling a device A2 to reproduce substantially the same colors as the plurality of colors reproduced by the device A1 according to the plurality of first color value sets B1, the data of the plurality of second color value sets B2 being one to one correspondence with data of the plurality of second color value sets B1, each second color value set B2 including one achromatic control signal of a value for controlling the device A2 to use one achromatic color with a corresponding amount and at least one chromatic control signal of a value for controlling the device A2 to use at least one chromatic color with a corresponding amount, the plurality of second color value sets B2 including at least two achromatic color value sets B2a that correspond to the at least two range-falling achromatic color value sets B1a, all of the at least one chromatic control signal in each second achromatic color value set B2a having a value of zero to control the device A2 to fail to use the at least one chromatic color.

BRIEF DESCRIPTION OF THE DRAWINGS

The above and other objects, features and advantages of the invention will become more apparent from reading the following description of the preferred embodiments taken in connection with the accompanying drawings in which:

FIG. 1 is a block diagram showing a configuration of a color conversion device according to a first embodiment of the present invention;

FIG. 2 is a flowchart of a device link processing executed according to the first embodiment;

FIG. 3($b$) shows a first achromatic-color value table T1prepared during the device link processing of FIG. 2;

FIG. 3($c$) shows a second achromatic-color value table T2 prepared during the device link processing of FIG. 2;

FIG. 3($d$) shows an achromatic-color value correspondence table T3 prepared during the device link processing of FIG. 2;

FIG. 10 is a flowchart of a color conversion process executed according to the fourth embodiment.

DETAILED DESCRIPTION OF THE PREFERRED EMBODIMENTS

Figure 3A:
FIG. 3($a$) shows an original lookup table LUT0 prepared during the device link processing of FIG. 2.
FIG. 3(e) shows a modified lookup table LUT1 prepared during the device link processing of FIG. 2.

A color conversion device according to preferred embodiments of the present invention will be described while referring to the accompanying drawings wherein like parts and components are designated by the same reference numerals to avoid duplicating description.

First Embodiment

A color conversion device 1 according to the present embodiment is constructed from a personal computer.

As shown in FIG. 1, the color conversion device 1 includes: a central control unit 10, an input device interface 17, a communication interface 19, a display 21, and other units (not shown). The central control unit 10 includes: a CPU 11, a ROM 13, a RAM 15, and a hard disk 14. The input device interface 17 is for communicating with input devices such as a mouse 30 and a keyboard 32. The communication interface 19 is for communicating with two printers A (printer A1 and printer A2) via a network a such as a LAN. The CPU 11, the ROM 13, the RAM 15, the hard disk 14, the input device interface 17, the communication interface 19, the display 21, and the other units (not shown) are connected with one another by a bus 23. Communications required to execute various kinds of processing are performed via this bus 23.

Figure 4:
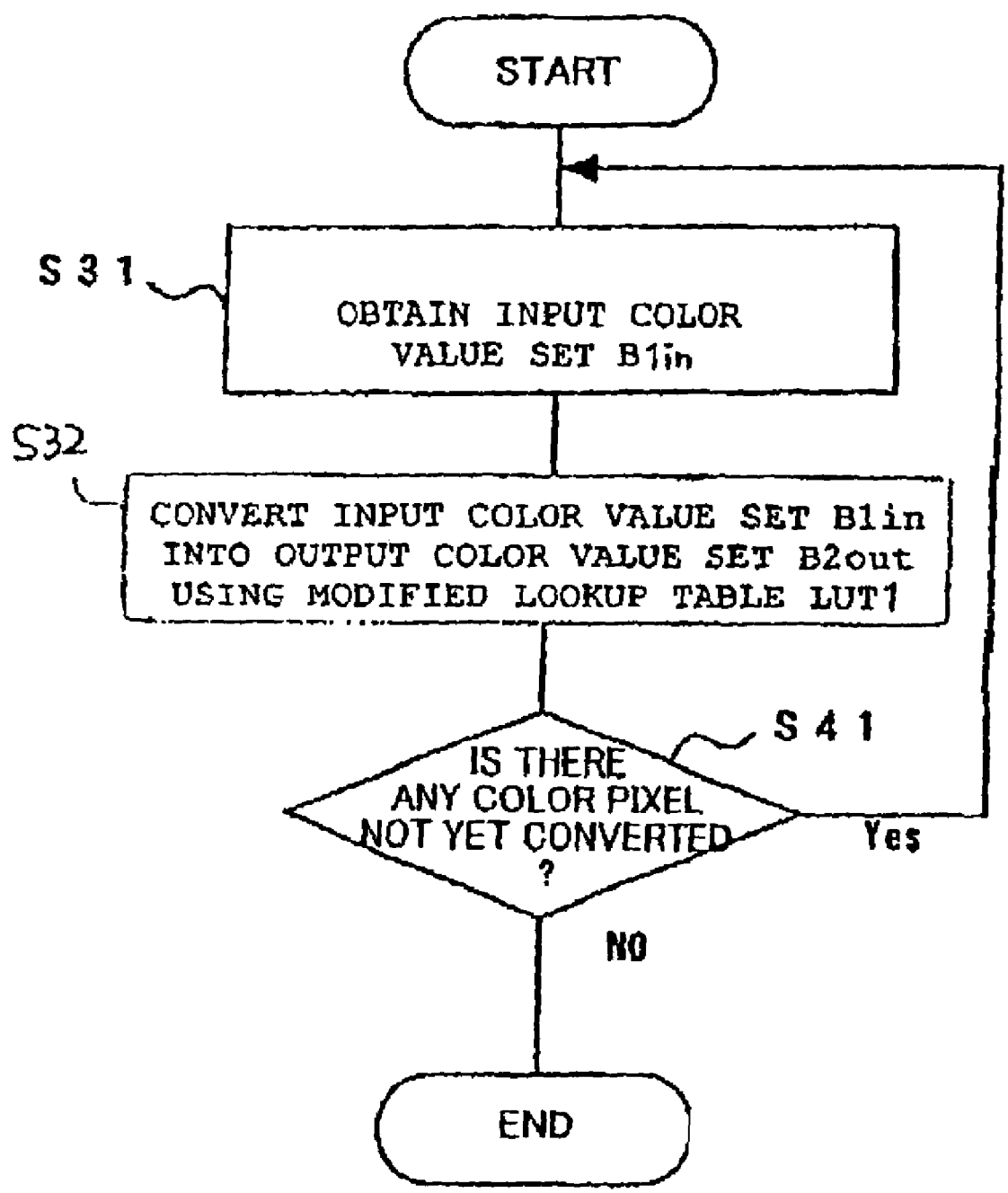
FIG. 4 is a flowchart of a color conversion process executed according to the first embodiment.

The ROM 3 previously stores therein: data of a device link processing program of FIG. 2; data of a color conversion processing program of FIG. 4; and data of profiles PF (PF1 for the printer A1 and profile PF2 for the printer A2). Instead of the ROM 3, the hard disk 14 may previously store this data therein. The CPU 11 executes the device link processing program of FIG. 2 by using the profiles, PF1 and PF2 to prepare a modified lookup table LUT 1 shown in FIG. 3(e). The CPU 11 executes the color conversion processing program of FIG. 4 by using the modified lookup table LUT 1.

Each printer A is for forming multi-color images using inks of colors of cyan (C), magenta (M), yellow (Y), and black (K). The color conversion device 1 supplies each printer A with a plurality of color value sets B (C, M, Y, K) indicative of a plurality of pixels in a multi-color image desired to be formed. Each color value set B (C, M, Y, K) includes a cyan control signal, a magenta control signal, a yellow control signal, and a black control signal. The magnitude C, M, Y, K of each control signal is an integer in a range of zero (0) to 255 to indicate a desired tone of the corresponding color. When the printer A receives a color value set B (C, M, Y, K) indicative of one pixel, the printer A determines the amounts of ink of the cyan, magenta, yellow, and black colors to be deposited on the subject pixel position on a sheet of paper. The printer A forms each pixel by superimposing on the sheet of paper the inks of the four colors in the determined amounts, thereby forming one multi-color image.

The color value sets B (C, M, Y, K) supplied to the printer A1 will be referred to as color value sets B1. (C1, M1, Y1, K1) hereinafter. The color value sets B (C, M, Y, K) supplied to the printer A2 will be referred to as color value sets B2 (C2, M2, Y2, K2) hereinafter.

It is noted that the printers A1 and A2 use inks with coloring characteristics different from each other. Accordingly, even if the values C1, M1, Y1, K1 in some color value set B1 (C1, M1, Y1, K1) are equal to the values C2, M2, Y2, K2 in some color value set B2 (C2, M2, Y2, K2), the color state reproduced by the printer A1 based on the color value set B1 will be different from the color state reproduced by the printer A2 based on the color value set B2.

The profile PF for each printer A is used for: converting a color value set B (C, M, Y, K) used in the subject printer A into a standard color value set D (L, a, b); and for converting a standard color value set D (L, a, b) into a color value set B (C, M, Y, K). The standard color value set D (L, a, b) includes an "L" value, an "a" value, and a "b" value. The "L" value is an integer in a range of zero (0) to 100. The "a" value is an integer in a range of −128 to +127. The "b" value is an integer in a range of −128 to +127.

The profile PF includes: a CMYK-to-Lab profile used for converting a CMYK control signal value set B (C, M, Y, K) into an Lab standard color value set D (L, a, B); and an Lab-to-CMYK profile used for converting an Lab standard color value set D (L, a, B) into a CMYK control signal value set B (C, M, Y, K).

The CMYK-to-Lab profile includes: data of four one-dimensional CMYK tone curves used for adjusting the control signal values C, M, Y, K, respectively; data of a four-dimensional CMYK-to-Lab lookup table used for converting a set of CMYK values (C, M, Y, K) into a set of Lab values (L, a, b); and data of three one-dimensional Lab tone curves used for adjusting the Lab values L, a, b, respectively. The four-dimensional CMYK-to-Lab lookup table stores therein a plurality of sets of Lab values (L, a, b) in correspondence with a plurality of CMYK lattice points (C, M, Y, K) that are arranged in a four-dimensional CMYK lattice space, in which C-, M-, Y-, and K-axes extend perpendicularly with one another. The CMYK-to-Lab profile therefore converts four dimensional CMYK information into three dimensional Lab information.

The Lab-to-CMYK profile includes: data of three one-dimensional Lab tone curves used for adjusting the Lab values L, a, b, respectively; data of a three-dimensional Lab-to-CMYK lookup table used for converting a set of Lab values (L, a, b) into a set of CMYK values (C, M, Y, K); and data of four one-dimensional CMYK tone curves used for adjusting the control signal values C, M, Y, K, respectively. The three-dimensional Lab-to-CMYK lookup table stores therein a plurality of sets of CMYK values (C, M, Y, K) in correspondence with a plurality of Lab lattice points (L, a, b) that are arranged in a three-dimensional Lab lattice space, in which L-, a-, and b-axes extend perpendicularly with one another.

It is noted that each Lab standard color value set (L, a, b) is represented by three parameters L, a, and b, whereas the CMYK color value set (C, M, Y, K) is represented by four parameters. Accordingly, more than one CMYK color value sets (C, M, Y, K) can correspond to a single Lab standard color value set (L, a, b). The Lab-to-CMYK profile has been created in advance so that one CMYK color value set is set for each Lab standard color value set by selecting, among the more than one CMYK color value sets for the subject Lab standard color value set, one CMYK color value set that attains high color reproducibility.

For example, it is now assumed that some Lab color value set (L, a, b) indicative of a chromatic color can be reproduced by: one set of CMYK data (C, M, Y, 0) wherein K is equal to zero; and another set of CMYK data (C, M, Y, K) wherein K is greater than zero. In this case, generally, the set of CMYK data (C, M, Y, 0) is set for such a chromatic Lab color value set (L, a, b) in the Lab-to-CMYK lookup table.

It is also assumed that some Lab color value set (L, a, b) indicative of a light-density achromatic color can be reproduced by: one set of CMYK data (C, M, Y, 0) wherein K is equal to zero; and another set of CMYK data (0, 0, 0, K) wherein C, M, and Y are equal to zero and K is greater than zero. In this case, generally the set of CMYK data (C, M, Y, 0) is set for such a light-density achromatic Lab color value set (L, a, b) in the Lab-to-CMYK lookup table.

It is also assumed that some Lab color value set (L, a, b) indicative of a dark-density achromatic color can be reproduced by: one set of CMYK data (C, M, Y, K) wherein all the C, M, Y, and K values are greater than zero; and another set of CMYK data (0, 0, 0, K) wherein C, M, and Y are equal to zero. In this case, generally, the set of CMYK data (C, M, Y, K) wherein C, M, Y, and K are greater than zero is set for such a dark-density achromatic Lab color value set (L, a, b) in the Lab-to-CMYK lookup table.

It is noted that the profile PF1 for printer A1 is used for: converting a color value set 31 (C1, M1, Y1, K1) used in the printer A1 into a standard color value set D (L, a, b); and for converting a standard color value set D (L, a, b) into a color value set B1 (C1, M1, Y1, K1). The profile PF1 therefore includes: a CMYK-to-Lab profile used for converting a CMYK control signal value set B1 (C1, M1, Y1, K1) into an Lab standard color value set D (L, a, B); and an Lab-to-CMYK profile used for converting an Lab standard color value set D (L, a, B) into a CMYK control signal value set B1 (C1, M1, Y1, K1). The profile PF2 for printer A2 is used for: converting a color value set B2 (C2, M2, Y2, K2) used in the printer A2 into a standard color value set D (L, a, b); and for converting a standard color value set D (L, a, b) into a color value set B2 (C2, M2, Y2, K2). The profile PF2 therefore includes: a CMYK-to-Lab profile used for converting a CMYK control signal value set B2 (C2, M2, Y2, K2) into an Lab standard color value set D (L, a, B); and an Lab-to-CMYK profile used for converting an Lab standard color value set D (L, a, B) into a CMYK control signal value set B2 (C2, M2, Y2, K2).

With the above-described configuration, the color conversion device 1 performs a device link processing of FIG. 2 to create the modified lookup table LUT1 of FIG. 3(e). By using the modified lookup table LUT1, the color conversion device 1 can convert an input color value set B1in directly into a corresponding output color value set B2out during the color conversion processing of FIG. 4.

The CPU 11 starts executing the device link processing of FIG. 2 when a user manipulates the mouse 30 or the keyboard 32 to input his/her instruction to start the device link processing.

It is noted that before starting the device link processing, the CPU 11 normalizes the original range of 0 to 255 for the control signals C1, M1, Y1, K1, C2, M2, Y2, K2 into a widened range of 0 to 65,535. The CPU 11 also normalizes, into the same range of 0 to 65,535, the original range of 0 to 100 for the "L" value, the original range of −128 to +127 for the "a" value, and the original range of −128 to +127 for the "b" value. By using such a widened range, the CPU 11 can produce the lookup table LUT1 that can attain a highly accurate conversion.

In S1, the CPU 11 reads the profiles PF1 and PF2 from the ROM 13. The CPU 11 prepares an original lookup table LUT0 shown in FIG. 3(a) in a manner described below by using the profiles PF1 and PF2.

It is noted that the original lookup table LUT0 indicates the direct relationship between the color value sets B1 for the printer A1 and the color value sets B2 for the printer A2.

A four dimensional CMYK color space is defined, in which four axes (C axis, M axis, Y axis, and K axis) extend perpendicularly with one another. Each axis extends from zero (0) to 65,535 (255). A plurality of lattice points are defined in the CMYK color space by uniformly dividing each axis. In this example, 83,521 (=17×17×17×17) lattice points are defined in the CMYK color space by dividing each axis in the range of 0 to 65,535 (255) uniformly into sixteen ranges. Seventeen lattice points are defined at the coordinates of 0, 4,095, 8,191, . . . , 61,439, and 65,535 along each axis.

In S1, therefore, the CPU 11 first lists up 83,521 number of representative color value sets B1 (C1, M1, Y1, K1), which are located on the 83,521 lattice points in the CMYK color space, in the left column of the original lookup table LUT0.

Then, for one representative color value set B1 (C1, M1, Y1, K1), the CPU 11 calculates an Lab standard color value set D1 (L, a, b) by using the CMYK-to-Lab profile in the profile PF1.

More specifically, the CPU 11 first adjusts the values C1, M1, Y1, and K1 in the subject color value set B1 (C1, M1, Y1, K1) by executing an interpolation processing using the one-dimensional CMYK tone curves. The CPU 11 then converts the thus adjusted color value set B1 (C1, M1, Y1, K1) into a standard color value set D1 (L, a, b) by executing an interpolation processing onto the four-dimensional CMYK-to-Lab lookup table. Then, the CPU 11 adjusts the standard color value set D1 (L, a, b) by executing an interpolation processing using the one-dimensional Lab tone curves. As a result, it is known that when the printer A1 is controlled by the subject color value set B1 (C1, M1, Y1, K1), the printer A1 will produce a color whose color state is represented by the Lab standard color value set D1 (L, a, b).

Next, the CPU 11 calculates a color value set B2 (C2, M2, Y2, K2) based on the standard color value set D1 (L, a, b) by using the Lab-to-CMYK profile in the profile PF2.

More specifically, the CPU 11 first adjusts the standard color value set D1 (L, a, b) by executing an interpolation processing using the one-dimensional Lab tone curves. The CPU 11 then converts the thus adjusted standard color value set D1 (L, a, b) into a color value set B2 (C2, M2, Y2, K2) by executing an interpolation processing onto the three-dimensional Lab-to-CMYK lookup table. Then, the CPU 11 adjusts the values C2, M2, Y2, and K2 in the color value set B2 (C2, M2, Y2, K2) by executing an interpolation processing using the one-dimensional CMYK tone curves. As a result, it is known that when the printer A2 is controlled by the color value set B2 (C2, M2, Y2, K2) the printer A2 will produce a color whose color state is represented by the Lab standard color value set D1 (L, a, b).

The CPU 11 enters the thus obtained color value set B2 (C2, M2, Y2, K2) in the right column of the original lookup table LUT0 in association with the subject color value set B1 (C1, M1, Y1, K1).

The CPU 11 executes the above-described processes for all the 83,521 number of color value sets B1 (C1, M1, Y1, K1) that are listed in the left column of the original lookup table LUT0. As a result, 83,521 number of color value sets B2 (C2, M2, Y2, K2), which are obtained respectively for the 83,521 number of the original color value sets B1 (C1, M1, Y1, K1), are listed in the right column of the original lookup table LUT0, in a manner that each color value set B2 (C2, M2, Y2, K2) is located in association with its corresponding original color value set B1 (C1, M1, Y1, K1).

When the original lookup table LUT0 is completely created in S1, the original lookup table LUT0 is temporarily stored in the RAM 15. The original lookup table LUT0 can serve as a device link profile, which ensures that a color printed by the printer A1 according to each color value set B1 (C1, M1, Y1, K1) and another color printed by the printer A2 according to a corresponding color value set B2 (C2, M2, Y2, K2) will substantially the same with each other.

It is noted that the 83,521 number of color value sets B1 (C1, M1, Y1, K1) have seventeen different achromatic color value sets B1a (0, 0, 0, K1) therein. Each achromatic color value set B1a (0, 0, 0, K1) has cyan, magenta, and yellow control signals C1, M1, Y1 with zero values, but has black control signals K1 with the seventeen different values of 0, 4,079, 8,191, 12,287, 16,383, 20,479, 24,575, 28,671, 32,767, 36,863, 40,959, 45,055, 49,151, 53,247, 57343, 61,439, and 65,535.

It is noted that the printers A1 and A2 use inks with different coloring characteristics. Accordingly, in the original lookup table LUT0, the values C1, M1, Y1, K1 in one color value set B1 (C1, M1, Y1, K1) are generally different from the values C2, M2, Y2, K2 in the corresponding color value set B2 (C2, M2, Y2, K2).

It is also noted that the original lookup table LUT0 is created by using the profiles PF1 and PF2 and that the profiles PF1 and PF2 have the above-described characteristics. Accordingly, the original lookup table LUT0 generally has color value sets B2 (C2, M2, Y2, 0) in correspondence with light-density color value sets B1 (C1, M1, Y1, K1). For example, the original lookup table LUT0 generally has color value sets B2 (C2, M2, Y2, 0) in correspondence with light-density achromatic color value sets B1 (0, 0, 0, K1). The original lookup table LUT0 generally has color value sets B2 (C2, M2, Y2, K2), whose values C2, M2, Y2, K2 are all greater than zero, in correspondence with dark-density color value sets B1 (C1, M1, Y1, K1). For example, the original lookup table LUT0 generally has color value sets B2 (C2, M2, Y2, K2), whose values C2, M2, Y2, K2 are all greater than zero, in correspondence with dark-density achromatic color value sets B1 (0, 0, 0, K1).

In this way, in the original lookup table LUT0, in correspondence with almost all of the sixteen achromatic color value sets B1a (0, 0, 0, K1) where K1 is greater than zero, achromatic color value sets B2a (0, 0, 0, K2) are not listed but color value sets B2 (C2, M2, Y2, K2) whose values C2, M2, Y2 are greater than zero and whose value K2 is greater than or equal to zero are listed. A color value set B2a (0, 0, 0, 0) or B2a (C2, M2, Y2, 0) is generally listed in correspondence with the achromatic color value set B1a (0, 0, 0, 0) where K1 is equal to zero.

If the color conversion device 1 uses this original lookup table LUT0 during the color conversion processing of FIG. 4, even when the printer A1 prints some achromatic color by using black ink only according to one achromatic color value set B1a (0, 0, 0, K1), the printer A2 will reproduce the achromatic color with substantially the same color state by using cyan, magenta, and yellow inks according to the corresponding chromatic color value set B2 (C2, M2, Y2, K2). This will possibly induce ink bleeding in a dark-density achromatic part. This will possibly induce coloring at an edge portion of a dark-density achromatic part if droplets of cyan, magenta, or yellow inks, which should be deposited on the same pixel position on a recording sheet, were deposited at slightly different positions from one another.

According to the present embodiment, therefore, the processes of S3-S9 are executed to modify the original lookup table LUT0 into the modified lookup table LUT1, wherein each achromatic color value set B1a (0, 0, 0, K1) is associated with an appropriate achromatic color value set B2a (0, 0, 0, K2).

Next, the processes of S3-S9 will be described.

In S3, the CPU 11 prepares a first achromatic-color value table T1 shown in FIG. 3(b) in a manner described below.

In the left column of the first achromatic-color value table T1, the CPU 11 lists up the seventeen representative achromatic color value sets B1a (0, 0, 0, K1) wherein K1 is equal to 0, 4,079, 8,191, 12,287, 16,383, 20,479, 24,575, 28,671, 32,767, 36,863, 40,959, 45,055, 49,151, 53,247, 57343, 61,439, and 65,535.

For each achromatic color value set B1a (0, 0, 0, K1) the CPU 11 calculates a standard color value set D1 (L, a, b) by using the profile PF1. More specifically, the CPU 11 first adjusts the values 0, 0, 0, and K1 in the subject color value set B1 (0, 0, 0, K1) by executing an interpolation processing using the one-dimensional CMYK tone curves. The CPU 11 then converts the thus adjusted color value set B1 (0, 0, 0, K1) into a standard color value set D1 (L, a, b) by executing an interpolation processing onto the four-dimensional CMYK-to-Lab lookup table. Then, the CPU 11 adjusts the standard color value set D1 (L, a, b) by executing an interpolation processing using the one-dimensional Lab tone curves.

In this way, seventeen standard color value sets D1 (L, a, b) are obtained in correspondence with the seventeen achromatic color value sets B1a (0, 0, 0, K1). The CPU 11 lists up the standard color value sets D1 (L, a, b) in the right column in association with the original achromatic color value sets B1a (0, 0, 0, K1). The thus obtained first achromatic-color value table T1 is temporarily stored in the RAM 15.

Next, in S5, the CPU 11 prepares a second achromatic-color value table T2 shown in FIG. 3(c) in a manner described below.

In the left column of the second achromatic-color value table T2, the CPU 11 lists up all the 65,536 number of achromatic color value sets B2a (0, 0, 0, K2) wherein K2 is equal to 0, 1, 2, . . . , and 65,535.

For each achromatic color value set B2a (0, 0, 0, K2), the CPU 11 calculates a standard color value set D2 (L, a, b) by using the profile PF2. More specifically, the CPU 11 first adjusts the values 0, 0, 0, and K2 in the subject color value set B2 (0, 0, 0, K2) by executing an interpolation processing using the one-dimensional CMYK tone curves. The CPU 11 then converts the thus adjusted color value set B2 (0, 0, 0, K2) into a standard color value set D2 (L, a, b) by executing an interpolation processing onto the four-dimensional CMYK-to-Lab lookup table. Then, the CPU 11 adjusts the standard color value set D2 (L, a, b) by executing an interpolation processing using the one-dimensional Lab tone curves.

In this way, 65,536 number of standard color value sets D2 (L, a, b) are obtained in correspondence with the 65,536 number of achromatic color value sets B2a (0, 0, 0, K2). The CPU 11 lists up the standard color value sets D2 (L, a, b) in the right column in association with the original achromatic color value sets B2a (0, 0, 0, K2). The thus obtained achromatic-color value correspondence table T3 is temporarily stored in the RAM 15.

In S6, the CPU 11 prepares an achromatic-color value correspondence table T3 as shown in FIG. 3(d) in a manner described below.

The CPU 11 first extracts one achromatic color value set B1a (0, 0, 0, K1) from the first achromatic-color value table T1, and sets the achromatic color value set B1a (0, 0, 0, K1) in the left column in the achromatic-color value correspondence table T3.

The CPU 11 then extracts, from the first achromatic-color value table T1, one standard color value set D1 (L, a, b) that is associated with the subject achromatic color value set B1a (0, 0, 0, K1) in the first achromatic-color value table T1.

Then, the CPU 11 searches the second achromatic-color value table T2 to select one standard color value set D2 (L, a, b), whose lightness value L is the closest to the lightness value L of the extracted standard color value set D1 (L, a, b) among the lightness values L of all the standard color value sets D2 (L, a, b) in the second achromatic-color value table T2.

Then, the CPU 11 extracts, from the second achromatic-color value table T2, one achromatic color value set B2a (0, 0, 0, K2) that is associated with the selected standard color value set D2 (L, a, b) in the second achromatic-color value table T2.

Then, the CPU 11 sets the extracted achromatic color value set B2a (0, 0, 0, K2) in the right column of the achromatic-color value correspondence table T3 in association with the subject achromatic color value set B2a (0, 0, 0, K1).

The CPU 11 executes the above-described processes for all the seventeen achromatic color value sets B1a (0, 0, 0, K1) in the first achromatic-color value table T1, thereby completely creating the achromatic-color value correspondence table T3 as shown in FIG. 3(d).

In the thus produced achromatic-color value correspondence table T3, all the seventeen achromatic color value sets B1a (0, 0, 0, K1) from the first achromatic-color value table T1 are listed on the left column. For these seventeen achromatic color value sets B1a (0, 0, 0, K1), seventeen achromatic color value sets B2 (0, 0, 0, K2) are listed on the right column as such color value sets that can reproduce substantially the same achromatic color states as the achromatic color value sets B1a (0, 0, 0, K1).

Next, in S9, the CPU 11 updates the original lookup table LUT0 of FIG. 3(a) into a modified lookup table LUT1 shown in FIG. 3(e) in a manner described below.

The CPU 11 updates the seventeen color value sets B2 (C2, M2, Y2, K2), which are listed in the original lookup table LUT0 in association with the seventeen achromatic color value sets B1a (0, 0, 0, K1), into the achromatic color value sets B2a (0, 0, 0, K2) which are now listed in the achromatic-color value correspondence table T3 in association with the subject seventeen achromatic color value sets B1a (0, 0, 0, K1).

When the modified lookup table LUT1 is completely created, the modified lookup table LUT1 is stored: in the hard disk 14. The thus obtained modified lookup table LUT1 serves as the modified device link profile.

Then, the device link processing is ended.

As described above, according to the present embodiment, the achromatic-color value correspondence table T3 that will maintain black print information can be easily prepared by simply extracting, from the color-value correspondence tables T1 and T2, the achromatic color value sets B1a and B2a, whose corresponding standard color value sets D1 and D2 are closest to each other, and associating them with each other.

It is now assumed that the printer A1 prints out a desired image by using a plurality of input color value sets B1in (C1in, M1in, Y1in, K1in) indicative of a plurality of pixels in an original image. It is also assumed that the user desires to use the printer A2 to print out the original image substantially with the same color state in such a case, the color conversion device 1 executes a color conversion process of FIG. 4 to convert the input color value sets B1in (C1in, M1in, Y1in, K1in) into output color value sets B2out (C2out, M2out, Y2out, K2out) by using the modified lookup table LUT1 of FIG. 3(e).

The CPU 11 starts executing the color conversion processing of FIG. 4 when the user manipulates the mouse 30 or the keyboard 32 to input his/her instruction to start the color conversion processing.

First, in S31, the CPU 11 obtains from the RAM 15 an input color value set B1in (C1in, M1in, Y1in, K1in) for one pixel in the entire image. In this example, the values C1in, M1in, Y1in, K1in are integers in the range of 0 to 255. Accordingly, the CPU 11 normalizes the values C1in, M1in, Y1in, K1in into values within the range of 0 to 65,535.

Next, in S32, the CPU 11 directly converts the input color value set B1in (C1in, M1in, Y1in, K1in) into an output color value set B2out (C2out, M2out, Y2out, K2out) by using the modified lookup table LUT1 of FIG. 3(e). The thus obtained values C2out, M2out, Y2out, K2out are in the range of 0 to 65,535. Accordingly, the CPU 11 normalizes the values C2out, M2out, Y2out, K2out back into values within the range of 0 to 255.

Next, in S41, the CPU 11 judges whether or not there remains some pixel which has not yet been subjected to the color conversion. If there remains some pixel which has not yet been subjected to the color conversion (S41: YES), the processing of S31 to S41 is executed again. On the other hand, if there remains no pixel which has not yet been subjected to the color conversion (S41: NO), the color conversion processing is ended.

The color conversion process of S32 will be described below in greater detail.

If the input color value set B1in (C1in, M1in, Y1in. K1in) is either one of the 83,521 color value sets B1 (C1, M1, Y1, K1) that are listed in the left column of the lookup table LUT1 (FIG. 3(e)), the CPU 11 selects a color value set B2 (C2, M2, Y2, K2) that is listed in the right column of the lookup table LUT1 in correspondence with the subject input color value set B1in (C1in, M1in, Y1in, K1in), and sets the selected color value set B2 (C2, M2, Y2, K2) as an output color value set B2out (C2out, M2out, Y2out, K2out). In this way, the CPU 11 directly converts the input color value set B1in (C1in, M1in, Y1in, K1in) into the output color value set B2out (C2out, M2out, Y2out, K2out).

On the other hand, if the input color value set B1in (C1in, M1in, Y1in, K1in) is other than the 83,521 color value sets B1 (C1, M1, Y1, K1) listed in the left column of the lookup table LUT1, the CPU 11 first selects several color value sets B1 (C1, M1, Y1, K1) that are listed in the left column of the lookup table LUT1 and that are located in the CMYK color space as surrounding the input color value set B1in (C1in, M1in, Y1in, K1in). The CPU 11 also selects several color value sets B2 (C2, M2, Y2, K2) that are listed in the right column of the lookup table LUT1 in association with the selected several color value sets B1 (C1, M1, Y1, K1). The CPU 11 calculates color distances between the input color value set B1in (C1in, M1in, Y1in, K1in) and the selected several color value sets B1 (C1, M1, Y1, K1). The CPU 11 executes an interpolation calculation onto the selected several color value sets B2 (C2, M2, Y2, K2) to determine an output color value set B2out (C2out, M2out, Y2out, K2out) that is located in the CMYK color space as being spaced from the selected several color value sets B2 (C2, M2, Y2, K2) by the same color distances as the color distances between the input color value set B1in (C1in, M1in, Y1in, K1in) and the selected several color value sets B1 (C1, M1, Y1, K1).

It is now assumed that the input color value set B1in (C1in, M1in, Y1in, K1in) is some achromatic color value set B1in (0, 0, 0, K1in).

If the input achromatic color value set B1in (0, 0, 0, K1in) is either one of the seventeen achromatic color value sets B1a (0, 0, 0, K1) that are listed in the left column of the lookup table LUT1, the CPU 11 selects an achromatic color value set B2a (0, 0, 0, K2) that is listed in the right column of the lookup table LUT1 in correspondence with the subject input achromatic color value set B1in (0, 0, 0, K1in), and sets the selected achromatic color value set B2a (0, 0, 0, K2) as an output achromatic color value set B2out (0, 0, 0, K2out). In this way, the CPU 11 directly converts the input achromatic color value set B1ain (0, 0, 0, K1in) into the output achromatic color value set B2aout (0, 0, 0, K2out).

On the other hand, if the input achromatic color value set B1in (0, 0, 0, K1in) is other than the seventeen achromatic color value sets B1a (0, 0, 0, K1) listed in the left column of the lookup table LUT1, the CPU 11 first selects several color value sets B1 (C1, M1, Y1, K1) that are listed in the left column of the lookup table LUT1 and that are located in the CMYK color space as surrounding the input achromatic color value set B1in (0, 0, 0, K1in). It is noted that the selected several color value sets B1 (C1, M1, Y1, K1) include two achromatic color value sets B1a (0, 0, 0, K1) that are located on both sides of the input achromatic color value set B1ain (0, 0, 0, K1in) along the K axis. The CPU 11 also selects several color value sets B2 (C2, M2, Y2, K2) that are listed in the right column of the lookup table LUT1 in association with the selected several color value sets B1 (C1, M1, Y1, K1). The selected several color value sets B2 (C2, M2, Y2, K2) therefore include two achromatic color value sets B2a (0, 0, 0, K2) that correspond to the two achromatic color value sets B1a (0, 0, 0, K1). The CPU 11 calculates color distances between the input color value set B1in (0, 0, 0, K1in) and the selected several color value sets B1 (C1, M1, Y1, K1). The CPU 11 executes an interpolation calculation onto the selected several color value sets B2 (C2, M2, Y2, K2) to determine an output color value set B2out (C2out, M2out, Y2out, K2out) that is located in the CMYK color space as being spaced from the selected several color value sets B2 (C2, M2, Y2, K2) by the same color distances as the color distances between the input color value set B1in (0, 0, 0, K1in) and the selected several color value sets B1 (C1, M1, Y1, K1). As a result, the output color value set B2out (C2out, M2out, Y2out, K2out) is determined as an achromatic color-value set (0, 0, 0, K2out).

In this way, the color conversion device 1 can convert any input color value set B1in (C1in, M1in, Y1in, K1in) into an output color value set B2out (C2out, M2out, Y2out, K2out). The color conversion device 1 can convert any input achromatic color value set B1in (0, 0, 0, K1in) into an output achromatic color value set B2out (0, 0, 0, K2out). The color state obta ined by the printer A1 based on each input color value set B1in (C1in, M1in, Y1in, K1in) will be substantially the same as the color state obta ined by the printer A2 based on the corresponding output color value set B2out (C2out, M2out, Y2out, K2out). If the input color value set B1in (C1in, M1in, Y1in, K1in) is an achromatic color value set B1in (0, 0, 0, K1in), the printer A1 prints a corresponding pixel by using black ink only. The input achromatic color value set B1in (0, 0, 0, K1in) is always converted into an output achromatic color value set B2out (0, 0, 0, K2out), and therefore the printer A2 will reproduce the corresponding pixel also by using black ink only. Accordingly, if the original image has an achromatic image part that is printed by the printer A1 by using black ink only, the achromatic part will be reproduced by the printer A2 also by using the black ink only. The achromatic image part can be reproduced with high reproducibility.

In this way, according to the present embodiment, the achromatic color conversion characteristics between the achromatic color value sets B1a and the achromatic color value sets B2a in the achromatic-color value correspondence table T3 are incorporated as they are in the modified lookup table LUT1 during the device link processing. The modified lookup table LUT1 can be used in a general-purpose color conversion mechanism such as an ICC color management. Accordingly, the color conversion device 1 of the present embodiment can be provided in various general-purpose systems, in which various devices owned by a user are incorporated.

It is noted that data of the programs for the device link processing of FIG. 2 and for the color conversion processing of FIG. 4 are stored in the ROM 13 or the hard disk 14. However, the data of the programs may be stored in other various types of data recording media, such as a flexible disk, a magnetooptical disk, or the like, and may be loaded into a computer and executed thereby. The data of the programs may be loaded into the computer via a network such as the Internet.

In the above-described embodiment, in S32, the interpolation calculation is employed. Accordingly, it is sufficient to prepare each of the lookup tables LUT0 and LUT1 to list up only 17×17×17×17 (83521) number of pairs of color value sets B1, B2. It is unnecessary to prepare each of the lookup tables LUT0 and LUT1 to list up all the 256×256×256×256 (4,294,967,296) number of pairs of color value sets B1, B2. It is possible to use the ROM 13 and the hard disk 14 with small capacities in order to store the lookup tables LUT0 and LUT1.

As described above, according to the present embodiment, during the device link processing, the lookup table LUT0 is modified into the modified lookup table LUT1 so that achromatic color value sets B2a will be associated with all the achromatic color value sets B1a. Accordingly, during the color conversion processing, by using the modified lookup table LUT1, any input achromatic color value set B1in (0, 0, 0, K1in) will be converted into an output achromatic color value set B2out (0, 0, 0, K2out). In this way, the black-print image part in the input image that is reproduced by black ink only by the printer A1 will be ma inta ined as a black-print image part and printed by the printer A2 by black ink only. Thus, the black-print information of the input image can be ma inta ined through the color conversion processing.

During the device link processing, in S1, the original lookup table LUT0 is prepared in the form of a general-type device link profile that can be used in a general type ICC color management. Then, the first achromatic-color value table T1 is prepared in S3 by using the general-type profile PF1 for the printer A1 that complies with the ICC format. In the first achromatic-color value table T1, several achromatic color value sets B1a and their corresponding standard color value sets D1 are associated with each other. The second achromatic-color value table T2 is prepared in S5 by using the general-type profile PF2 for the printer A2 that also complies with the ICC format. In the second achromatic-color value table T2, plural achromatic color value sets B2a and their corresponding standard color value sets D2 are associated with each other. In S6, for each achromatic color value set B1a in the table T1, one achromatic color value set B2a, whose corresponding standard color value set D2 is the closest to the standard color value set D1 for the subject achromatic color value set B1a, is extracted from the second achromatic-color value table T2. The achromatic-color value correspondence table T3 is prepared by associating each achromatic color value set B1 a with the achromatic color value set B2a extracted from the table T2. In S9, the original lookup table LUT0 is modified by using the achromatic-color value correspondence table T3.

Thus, the original lookup table LUT0 in the ICC device link profile form, which fails to properly indicate the correspondence between achromatic colors in the devices A1 and A2, is modified into the modified lookup table LUT1 that properly indicates the correspondence between the achromatic colors in the devices A1 and A2. In the modified lookup table LUT1, the color value sets B1 and B2 are arranged in the form that can be utilized as a general-type device link profile. By using this modified lookup table LUT1, it is possible to ma inta in black-print information through the general-type color-conversion process of FIG. 4 without using a special color conversion method.

Second Embodiment

Figure 5:
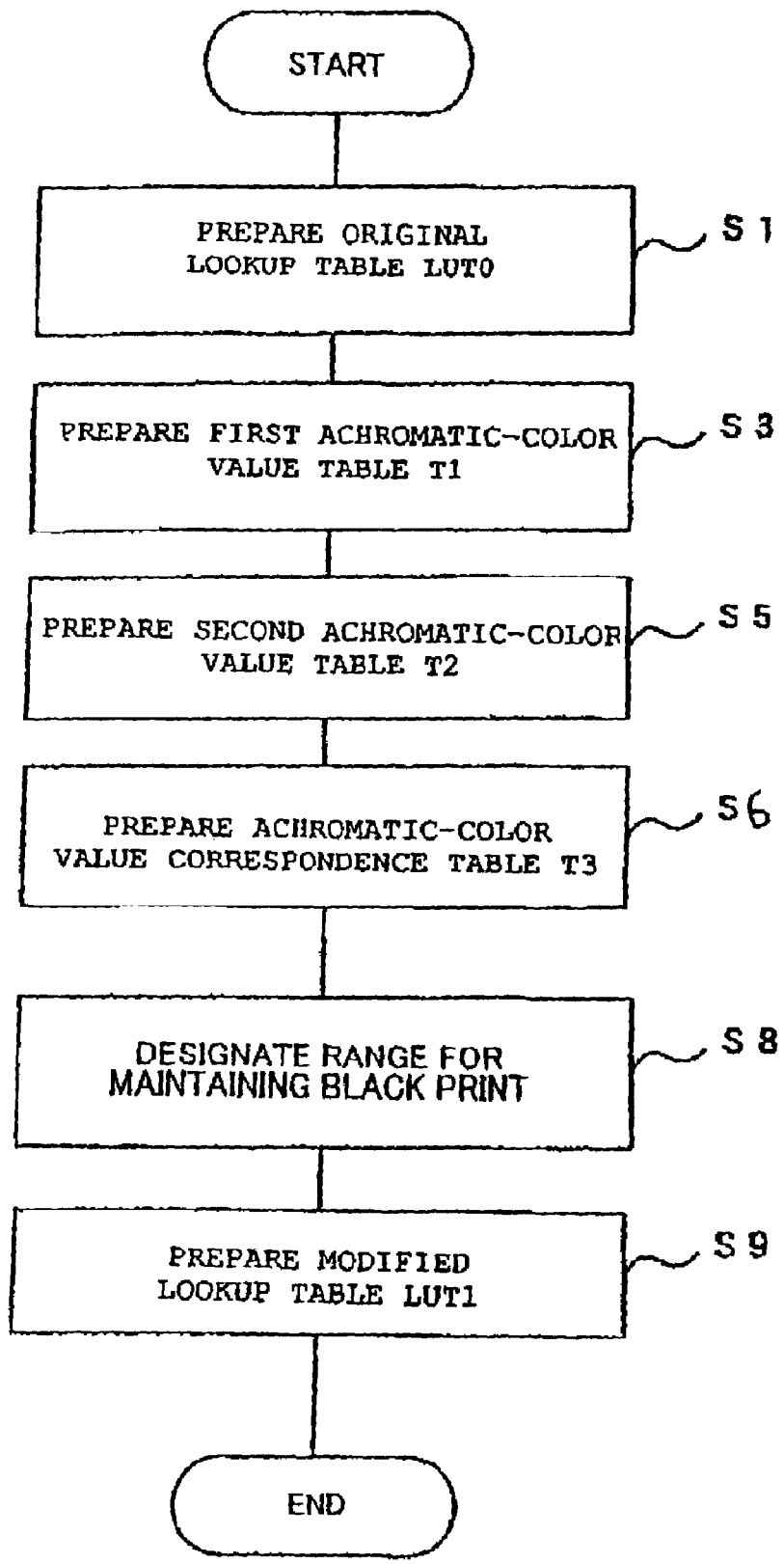
FIG. 5 is a flowchart of a device link processing executed according to a second embodiment.

Next, the color conversion device according to a second embodiment will be described with reference to FIG. 5.

The color conversion device 1 of the present embodiment has the same configuration as that (FIG. 1) of the first embodiment, and executes the color conversion process the same as that (FIG. 4) of the first embodiment. However, the color conversion device 1 of the present embodiment executes a device link processing as shown in FIG. 5.

The device link processing according to the present embodiment is different from that of the first embodiment (FIG. 2) in that a process of S8 is added and that the process of S9 is modified in a manner described below.

In the first embodiment (FIG. 2), in S9, all the seventeen color value sets B2 (C2, M2, Y2, K2), which are listed in the original lookup table LUT0 in association with all the seventeen achromatic color value sets B1a (0, 0, 0, K1), are updated into the achromatic color value sets B2a (0, 0, 0, K2) that are listed in the achromatic-color value correspondence table T3 in correspondence with the achromatic color value sets B1a (0, 0, 0, K1).

However, according to the present embodiment, in S8, a black print maintaining range for the printer A2 is set. The black print maintaining range is defined along the K-axis (black control signal axis). The black print maintaining range can be set as any range within the entire lightness range of 0 to 255.

The black print maintaining range is previously set and stored in the ROM 13 or the hard disk 14. In S8, data of the black print maintaining range is read from the ROM 13 or the hard disk 14 and set in the RAM 15 for the present device link processing. Instead, the CPU 11 may control the display 21 in S8 by using a graphical user interface (not shown) to enable the user to input his/her desired black print maintaining range by using the mouse 30 or the key board 32.

In S9, the CPU 11 searches the original lookup table LUT0 to select achromatic color value sets B1a (0, 0, 0, K1), whose black-control signal values K1 are within the black print maintaining range. The CPU 11 then selects color value sets B2 (C2, M2, Y2, K2) that are listed in association with the selected range-falling achromatic color value sets B1a (0, 0, 0, K1). The CPU 11 then searches the achromatic-color value correspondence table T3 to select the same range-falling achromatic color value sets B1a (0, 0, 0, K1). The CPU 11 then selects achromatic color value sets B2a (0, 0, 0, K2) that are listed in association with the range-falling achromatic color value sets B1a (0, 0, 0, K1). The CPU 11 updates the selected color value sets B2 (C2, M2, Y2, K2) in the original lookup table LUT0 into the selected achromatic color value sets B2a (0, 0, 0, K2), thereby creating the modified lookup table LUT1.

In this way, according to the present embodiment, the original lookup table LUT0 is modified in S9 to incorporate, only for those range-falling achromatic color value sets B1 a (0, 0, 0, K1), the correspondences between the achromatic color value sets B1a (0, 0, 0, K1) and the achromatic color value sets B2a (0, 0, 0, K2) that are listed in the achromatic-color value correspondence table T3.

During the color conversion process of FIG. 4, therefore an input achromatic color value set B1ain (0, 0, 0, K1in) will be converted into an output achromatic color value set B2ain (0, 0, 0, K2out) only when the K1in value is in the black-print maintaining range. A black print will be ma inta ined for the black-print maintaining range only.

It is preferable that in S8, the black print maintaining range is set to extend from the predetermined maximum value (255 (65535)) of the black control signals K1 down to a lower limit L. It is preferable that the lower limit L is equal to or lower than the second maximum value (240 (61439)) that appears in the original lookup table LUT0.

It is assumed that the lower limit L is set as being equal to 240 (61439) in S8. In this example, among all the seventeen achromatic color value sets B1a (0, 0, 0, K1) in the original lookup table LUT0, the darkest and second darkest achromatic color value sets (0, 0, 0, 65535) and (0, 0, 0, 61439) in the original lookup table LUT0 fall within the black print maintaining range. As shown in FIG. 3(d), achromatic color value sets (0, 0, 0, 65535) and (0, 0, 0, 59631) are listed in the achromatic-color value correspondence table T3 in correspondence with those darkest and second darkest achromatic color value sets (0, 0, 0, 65535) and (0, 0, 0, 61439). Accordingly, in S9, the color value sets (C2, M2, Y2, K2) for the darkest and second darkest achromatic color value sets (0, 0, 0, 65535) and (0, 0, 0, 61439) are replaced with those achromatic color value sets (0, 0, 0, 65535) and (0, 0, 0, 59631) Thus, the lookup table LUT1 created in S9 is different from the original lookup table LUT0 only in the two achromatic color value sets B2 for the darkest and second darkest achromatic color value sets B1.

During the color conversion process, in S31 (FIG. 4), the color conversion device 1 will possibly receive sixteen successive achromatic color value sets B1in of (0, 0, 0, 240), (0, 0, 0, 241), . . . , (0, 0, 0, 254), and (0, 0, 0, 255) whose K1in values of 240 to 255 are located within the black print maintaining range (240-255) of this example. If those sixteen successive achromatic color value sets B1in are received, the sixteen successive achromatic color value sets B1in are normalized to achromatic color value sets B1in (0, 0, 0, 61439) to (0, 0, 0, 65535), and are then converted into sixteen successive achromatic color value sets B2out by interpolating the two achromatic color value sets (0, 0, 0, 59631) and (0, 0, 0, 65535) that are listed in the modified lookup table LUT1. It is ensured that all the sixteen successive achromatic color value sets B1in of (0, 0, 0, 240) to (0, 0, 0, 255) will be converted into sixteen successive achromatic color value sets B2 (0, 0, 0, 59631) to (0, 0, 0, 65535). Accordingly, gradation in an achromatic dark-density part in an original image will be reproduced with high reproducibility by black ink only without suffering from any ink bleeding or any coloring in a dark-density achromatic part.

In the above description, the original lookup table LUT0 stores therein the 17×17×17×17 number of pairs of color value sets B1 and B2. However, the original lookup table LUT0 may store therein all the 256×256×256×256 number of pairs of color value sets B1 and B2. In such a case, it is preferable that the lower limit L of the black print maintaining range may be set equal to or smaller than 254, which is lower than the maximum value (255) by one (1).

It is assumed that the lower limit L is equal to 254. In this case, the black print maintaining range extends between 254 and 255. In such a case, in S9, the color value sets (C2, M2, Y2, K2) for the darkest and second darkest achromatic color value sets (0, 0, 0, 255 (655535)) and (0, 0, 0, 254 (65278)) are replaced with two successive achromatic color value sets (0, 0, 0, K2). Thus, the lookup table LUT1 produced in S9 becomes different from the original lookup table LUT0 only in the two achromatic color value sets B2 for the darkest and second darkest achromatic color value sets (0, 0, 0, 255 (655535)) and (0, 0, 0, 254 (65278)). During the color conversion processing, in S31, the color conversion device 1 will possibly receive two successive achromatic color value sets B1in of (0, 0, 0, 254) and (0, 0, 0, 255) whose black control signal values are located in the black print maintaining range of 254 to 255. These two successive achromatic color value sets B1in of (0, 0, 0, 254) and (0, 0, 0, 255) are converted into two successive achromatic color value sets B2out according to the modified lookup table LUT1. Accordingly, gradation in the dark-density achromatic part in an original image will be reproduced with high reproducibility by using black ink only without suffering from any ink bleeding or any coloring.

As described above, according to the present embodiment, it is preferable to set the black print maintaining range so that the black print maintaining range will extend from the darkest value (255) down to the lower limit L so as to include therein at least two darkest and second darkest achromatic color value sets B1a. It is possible to modify the original lookup table LUT0 into such a modified lookup table LUT1 that can convert at least two darkest and second darkest input achromatic color value sets B1in into darkest and second darkest output achromatic color value sets B2out. It is possible to appropriately reproduce gradations in a dark achromatic area in an input image. In this way, the black print maintaining range is preferably set to extend from the predetermined maximum value (255) to such a lower limit L that at least two successive achromatic color value sets B1, including the maximum achromatic control signal with K1 of 255, will be converted into at least two successive achromatic color value sets B2.

Third Embodiment

Next will be described a third embodiment with reference to FIGS. 5, 6, and 7.

Figure 6:
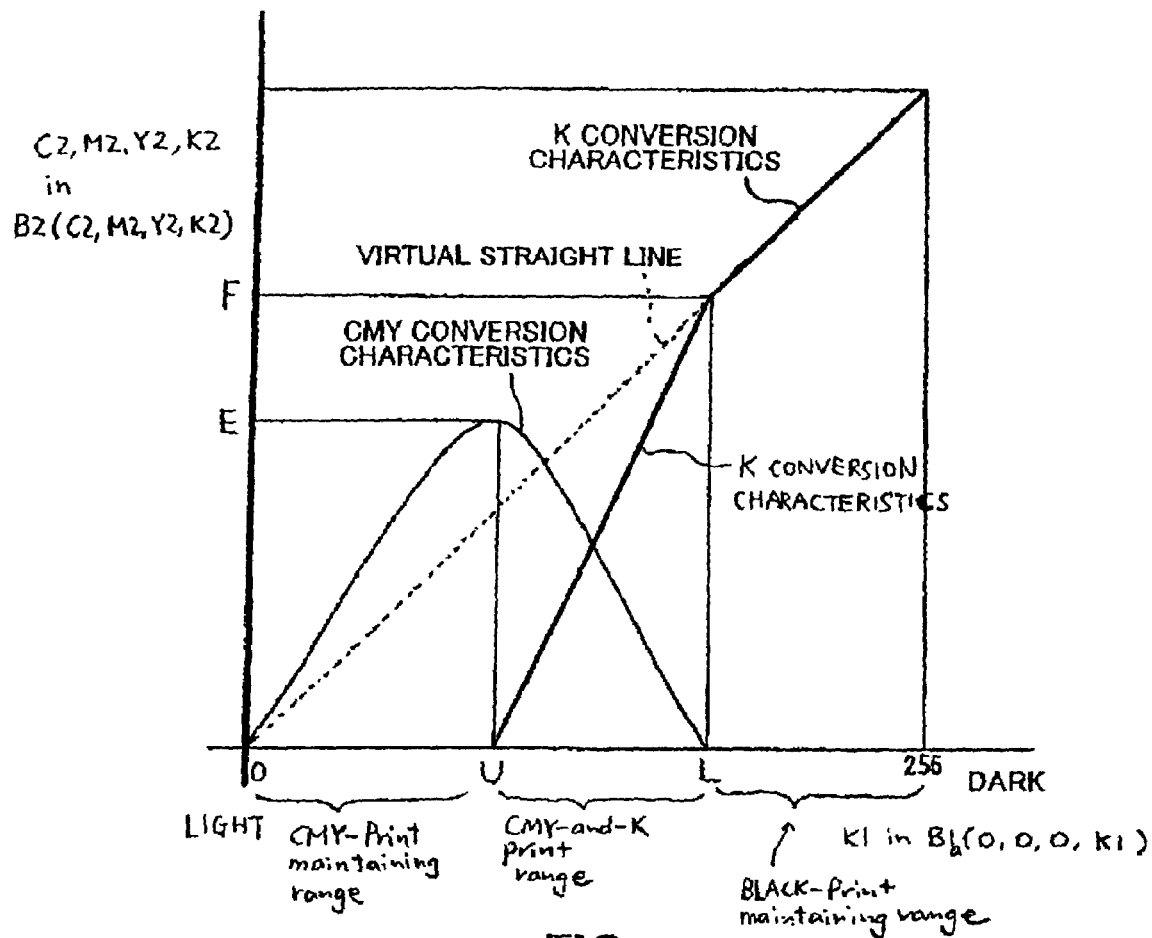
FIG. 6 is a graph explaining conversion characteristics attained by a modified lookup table according to a third embodiment.

According to the present embodiment, the processes of S8 and S9 in the device link processing (FIG. 5) are different from those in the second embodiment as will be described below, As a result, the modified lookup table LUT1 is created in S9 so as to have conversion characteristics as shown in FIG. 6 for achromatic color value sets B1 (0, 0, 0, K1). The color conversion process of FIG. 4 is executed by using this lookup table LUT1.

According to the present embodiment, not only the black print maintaining range, but also a CMY print maintaining range and a CMY-and-K print range are defined. The black print maintaining range is defined to extend between the maximum value (255) of the black control signal value K1 and its lower limit L. The CMY print maintaining range is defined to extend between the minimum value (0) of the black control signal value K1 and its upper limit U, which is lower than the lower limit L of the black print maintaining range. The CMY-and-K print range is defined to extend between the upper limit U of the CMY print maintaining range and the lower limit L of the black print maintaining range.

In S8, the values of the lower limit L and the upper limit U are set. It is noted that the values of the lower limit L and the upper limit U are previously determined in a manner to be described later and set in the ROM 13 or the hard disk 14. In S8, data of the lower limit L and the upper limit U is read from the ROM 13 or the hard disk 14 and is set in the RAM 15 to be used during the present device link processing.

In S9, the original lookup table LUT0 is modified similarly to the second embodiment. That is, the second color value sets B2 (C2, M2, Y2, K2) for those achromatic color value sets B1a (0, 0, 0, K1), whose K1 values fall within the black print maintaining range, are replaced with achromatic color value sets B2a (0, 0, 0, K2) that are listed for the subject achromatic color value sets B1a in the achromatic-color value correspondence table T3. The second color value sets B2 (C2, M2, Y2, K2) for those achromatic color value sets B1a (0, 0, 0, K1), whose K1 values fall within the CMY print maintaining range, are not replaced with any achromatic color value sets B2a (0, 0, 0, K2). The second color value sets B2 (C2, M2, Y2, K2) for other rema ining achromatic color value sets B1a (0, 0, 0, K1), whose K1 values fall within the CMY-and-K print range, are changed in a manner to be described later.

FIG. 6 shows how the modified lookup table LUT1 lists up color value sets B2 (C2, M2, Y2, K2) in correspondence with all the achromatic color value sets B1a (0, 0, 0, K1). The horizontal axis denotes the values K1 of the achromatic-color value sets B1a (0, 0, 0, K1), while the vertical axis denotes the values C2, M2, Y2, and K2 of the color value sets B2 (C2, M2, Y2, K2). Along the horizontal axis, the CMY print maintaining range is defined between the minimum value (0) and the upper limit U. The black print maintaining range is defined between the lower limit L and the maximum value (255). The CMY-and-K print range is defined between the upper limit U and the lower limit L.

A CMY conversion characteristics curve and a K conversion characteristic line appear in the graph of FIG. 6. The CMY conversion characteristics curve indicates how the values C2, M2, Y2 in the color value set B2 (C2, M2, Y2, K2) change as the black-control signal value K1 in the achromatic color value set B1 changes. The K conversion characteristic line indicates how the value K2 in the color value set B2 (C2, M2, Y2, K2) changes as the value K1 changes. A virtual straight line (dotted line) also appears in the graph of FIG. 6. The virtual straight line indicates the achromatic-color value correspondence table T3. That is, the virtual straight line indicates the correspondences between the K1 values in all the achromatic color value sets B1a (0, 0, 0, K1) and the K2 values in all the achromatic color value sets B2a (0, 0, 0, K2) in the table T3.

The correspondences between achromatic color value in sets B1a (0, 0, 0, K1) and color value sets B2 (C2, M2, Y2, K2) in the CMY print maintaining range are the same as the correspondences between achromatic color value sets B1a (0, 0, 0, K1) and color value sets B2 (C2, M2, Y2, K2) in the same range (CMY print maintaining range) in the original lookup table LUT0. Accordingly, as the value K1 increases, the cyan-, magenta-, and yellow-values C2, M2, Y2 (CMY conversion characteristics curve) increase, while the black value K2 (K conversion characteristics line) is kept being zero. The values C2, M2, Y2 become equal to E when the black value K1 becomes equal to the upper limit U.

The correspondences between achromatic color value sets B1a (0, 0, 0, K1) and color value sets B2 (C2, M2, Y2, K2) in the black print maintaining range are the same as the correspondences between the achromatic color value sets B1 a (0, 0, 0, K1) and the achromatic color value sets B2a (0, 0, 0, K2) in the same range (black print maintaining range) in the achromatic-color value correspondence table T3. Accordingly, as the value K1 increases, the black value K2 (K conversion characteristics line) increases, while the cyan-, magenta-, and yellow-values C2, M2, Y2 (K conversion characteristics line) are kept being zero. The value K2 is equal to the value of F when the black value K1 is equal to the lower limit L.

The correspondences between achromatic color value sets B1a (0, 0, 0, K1) and color value sets B2 (C2, M2, Y2, K2) in the CMY-and-K print range are different from both of: the correspondences between achromatic color value sets B1a (0, 0, 0, K1) and color value sets B2 (C2, M2, Y2, K2) in the same range (CMY-and-K print range) in the original lookup table LUT0 ; and the correspondences between the achromatic color value sets B1a (0, 0, 0, K1) and the achromatic color value sets B2a (0, 0, 0, K2) in the same range (CMY-and-K print range) in the achromatic-color value correspondence table T3. More specifically, as the value K1 increases, the black value K2 (K conversion characteristics line) increases linearly from the point (U, 0) to the point (L, F), while the cyan, magenta, and yellow values C2, M2, Y2 (CMY conversion characteristics curve) decrease gradually from the point (U, E) to the point (L, 0).

In S9, therefore, the correspondences between achromatic color value sets B1a (0, 0, 0, K1) and color value sets B2 (C2, M2, Y2, 0) in the CMY print maintaining range are set based on the original lookup table LUT0. The correspondences between achromatic color value sets B1a (0, 0, 0, K1) and color value sets B2 (0, 0, 0, K2) in the black print maintaining range are set based on the achromatic-color value correspondence table T3. The correspondences between the achromatic color value sets B1a (0, 0, 0, K1) and color value sets B2 (C2, M2, Y2, K2) in the CMY-and-K print range are created based on both the original lookup table LUT0 and the achromatic-color value correspondence table T3.

The CMY print maintaining range has a relatively small black value K1 and therefore represents a relatively light-density achromatic part in an image. When reproducing this light-density achromatic part by the printer A2, only cyan, magenta, and yellow ink will be used. No black ink will be mixed in cyan, magenta, and yellow ink. It is possible to prevent occurrence of graininess, which will possibly occur in the light-density part if black ink were mixed in cyan, magenta, and yellow ink.

The black print maintaining range has a relatively large black value K1 and therefore represents a relatively dark-density achromatic part. When reproducing this dark-density achromatic part by the printer A2, only black ink will be used. No cyan, magenta, or yellow ink will be mixed in the black ink. It is possible to prevent occurrence of ink bleeding that will possibly occur in the dark-density achromatic part if cyan, magenta, or yellow ink were mixed in black ink. It is possible to prevent occurrence of coloring that will possibly occur in an edge part of the dark-density achromatic part if droplets of cyan, magenta, or yellow inks, which should be deposited on the same pixel position on a recording sheet, were deposited at slightly different positions from one another.

The black values K1 in the CMY-and-K range are intermediate between the black values K1 in the CMY print maintaining range and the black values K1 in the black print maintaining range. The CMY-and-K range therefore represents a middle-density achromatic part. When reproducing this middle-density achromatic part by the printer A2, all of cyan-, magenta-, yellow-, and black inks will be used as being mixed with one another. The density is sufficiently high that no graininess will appear in this middle-density part. The density is sufficiently low that no ink bleeding will appear in the middle-density part and no coloring will appear in an edge part of the middle-density part.

According to the present embodiment, the value of the lower limit L of the black print maintaining range and the upper limit U of the CMY print maintaining range are determined in a manner described below.

First, the manner how to determine the lower limit L will be described.

First, the printer A2 is controlled by one chromatic color value set B2a (255, 255, 255, 0) to output a CMY-based achromatic print sample. The color density of this print sample is measured. The measured color density value is set as "OD3C". This color density value "OD3C" represents the maximum optical density of an achromatic color that can be reproduced by mixing cyan-, magenta-, and yellow-inks.

Next, the printer A2 is controlled by the 254 number of achromatic color value sets B2a (0, 0, 0, i), where "i" (K2) is an integer greater than 0 and smaller than 255, to output 254 number of K-based achromatic print samples. The color density of each print sample is measured. The measured color density value is set as "ODK[i]". This color density value "ODK[i]" represents the optical density of an achromatic color that is reproduced by black ink of the corresponding amount "i".

Then, several R-based achromatic print samples, whose color density values ODK[i] are greater than the color density value "OD3C" of the CMY-based achromatic print sample, are selected among all the 254 number of K-based achromatic print samples. Then, one K-based achromatic print sample, whose original value "i" is the smallest among the selected several K-based achromatic print samples, is selected. The lower limit L is set as equal to the value "i" of the finally-selected K-based achromatic print sample.

Next, the manner how to determine the upper limit U will be described with reference to FIG. 7.

First, the printer A2 is controlled by the 255 number of color value sets B2 (n, n, n, 1), where "n" are integers greater than or equal to 1 and smaller than or equal to 255, to output 255 number of achromatic print samples. The obtained 255 achromatic print samples are arranged in a row in the order of the magnitude of the value "n" from left to right as shown in FIG. 7. One print sample that is located on the left-end position in the print-sample row has been printed by a color value set B2 (1, 1, 1, 1), while another print sample that is located on the right-end position in the print-sample row has been printed by another color value set (255, 255, 255, 1). The black ink dots are outputted in all the print samples at the same amount corresponds to the value of "1". The amounts of cyan, magenta, and yellow inks increase monotonously from the most leftward print sample to the most rightward print sample in correspondence with the value of "n".

Figure 7:
FIG. 7 illustrates how to set values E and U in FIG. 6.

The print samples shown in FIG. 7 are observed by an human observer. The print samples are divided into two groups: a left group that is constituted by a series of print samples including the left-end print sample; and a right group that is constituted by another series of print samples including the right-end print sample. In the left group, graininess of black ink dots appears noticeable because the mixing density of the cyan, magenta, and yellow ink is relatively low. On the other hand, in the right group, graininess appears unnoticeable because the mixing density of the cyan, magenta, and yellow ink is sufficiently high. One print sample is selected from the right group (graininess-non-appearing group) that is located in the left-end position in the right group. This print sample acts as a border between the left group (graininess-appearing samples) and the right group (graininess-non-appearing samples). The value E in FIG. 7 is set as being equal to the value "n" in the color value set B2a (n, n, n, 1) that has been used to produce this border print sample. Then, the optical density of this border print sample is measured. The measured color density value is set as "ODc".

Next, the printer A2 is controlled by an achromatic color value set B2a (0, 0, 0, 255) to output a K-based achromatic print sample. The color density of this print sample is measured. The measured color density value is set as "ODe". This color density value "ODe" represents the optical density of the darkest achromatic color that can be reproduced by black ink only.

The value of the upper limit U is calculated by the following equation:

$$U = int((Odc/Ode)*255)$$

wherein "int ( )" is a function for converting the numerical value in the parentheses into an integer value.

It is noted that in the above-described example, the graininess of each print sample is evaluated subjectively. However, the graininess can be evaluated quantitatively in a manner described below.

First, each print sample is read with a scanner. A set of digital image data obtained by the scanner is subjected to an image processing, such as a Fourier transform. An image-processing result is multiplied by a value indicative of a human visual sensitivity. A resultant value is set as a value of Graininess Scale "gs". This Graininess Scale "gs" defines the graininess of the subject sample sensed by human visual eyes.

After the "gs" values are determined for all the print samples in the print-sample row, it is checked how the "gs" value changes from the left-end print sample to the right-end print sample. The print samples are divided into: a left group (graininess-appearing group) where the "gs" value changes; and a right group (graininess-non-appearing print group) where the "gs" value is maintained fixed. In the same manner as described above, the values E and U are determined based on the border print sample that is located at the left-end position in the right group (graininess-non-appearing print group).

Details of the "gs" value are described by Makoto Fujino in "Image Quality Evaluation of Ink Jet Prints" (Publication of Society of Photographic Association of Japan, vol. 60, No. 6 (1997), pp. 348-352), the disclosure of which is hereby incorporated by reference.

The graininess can be evaluated quantitatively in other manners. For example, the graininess can be evaluated in a manner as proposed by Susumu Imakawa in "Image Noise in Color Hard Copies" at the Symposium of the Institute of Electronics Engineers (Dec. 16, 1996), the disclosure of which is hereby incorporated by reference.

It is noted that a plurality of different printer A have different lightness ranges of 0 to U where the graininess appears noticeable. It is therefore preferable to execute the above-described operations for each of the plurality of different printers A that will possibly be used with the color conversion device 1 of the present embodiment.

As described above, according to the present embodiment, the black print maintaining range is set in S8 as a range between the lower limit L and the maximum value (255). The lower limit L has such a value that the achromatic tone equal to or greater than the lower limit L cannot be reproduced by the mixture of cyan, magenta, or yellow ink only. The lookup table LUT1 created in S9 ensures that relatively-dark achromatic colors falling in this black print maintaining range will be reproduced by black ink only. It is possible to prevent undesirable ink bleeding from occurring when reproducing such relatively-dark achromatic colors. It is possible to prevent undesirable coloring from occurring at an edge part of an image area of relatively-dark achromatic colors.

The CMY print maintaining range is also set in S8 as a range between the minimum value (0) and the upper limit U. The upper limit U has such a value that the achromatic tone lower than the upper limit U will suffer from graininess if black ink dots were mixed in the mixture of cyan, magenta, or yellow ink and that the achromatic tone higher than or equal to the upper limit U will suffer from no graininess even if black ink dots were mixed in the mixture of cyan, magenta, or yellow ink. The lookup table LUT1 created in S9 ensures that the relatively-light achromatic colors falling in this CMY print maintaining range will be reproduced by the mixture of cyan, magenta, and yellow ink only.

The CMY-and-K range is also set in S8 as a range between the upper limit U of the CMY print maintaining range and the lower limit L of the black print maintaining range. The upper limit U has such a value that the achromatic tone higher than or equal to the upper limit U will suffer from no graininess even if black ink dots were mixed in the mixture of cyan, magenta, or black ink. The lower limit L has such a value that the achromatic tone smaller than the lower limit L can be reproduced by the mixture of cyan, magenta, and yellow ink. The lookup table LUT1 created in S9 ensures that the middle-density achromatic colors falling in this CMY-and-K range will be reproduced by the mixture of all the cyan, magenta, yellow, and black ink.

It is assumed that an image has a gradation portion, where relatively-light achromatic colors, middle-density achromatic colors, and relatively-dark achromatic colors are arranged in this order. The relatively-light achromatic colors are located in the CMY print maintaining range, and therefore are reproduced by cyan, magenta, and yellow ink only. The relatively-dark achromatic colors are located in the black print maintaining range, and therefore are reproduced by black ink only. The middle-density achromatic colors are located in the CMY-and-K range, and therefore are reproduced by cyan, magenta, yellow, and black ink. According to the present embodiment, the CMY-and-K range is provided between the CMY print maintaining range and the black print maintaining range. It is possible to prevent the color state from changing rapidly from the relatively-dark area and the relatively-light area. It is possible to improve the image quality all over the entire tone range by preventing occurrence of ink bleeding in the dark area, occurrence of graininess in the light area, and occurrence of rapidly-changing color state between the dark area and the light area.

According to the present embodiment, even if the printer A2 is an ink jet printer that can output an image of a photographic quality and therefore that uses light color inks for cyan, magenta, and yellow, it is still possible to prevent graininess from appearing in light density areas. A portrait image of a woman, for example, can be reproduced appropriately. The shadow portion below her chin can be reproduced appropriately, without being erroneously perceived as her beard.

As described above, according to this embodiment, the black print maintaining range is set as being different from the CMY print maintaining range where graininess is expected to appear noticeable if black dots were mixed with cyan, magenta, and yellow dots. In other words, the black print maintaining range is set to such a range where no graininess is expected to appear noticeable even if black dots were mixed with cyan, magenta, and yellow dots. The original lookup table LUT0 is modified in S9 so that a black print will be ma inta ined only for the black-print maintaining range in which graininess is not expected to appear noticeable. Accordingly, during the color conversion processing of FIG. 4, an input achromatic color value set B1in (0, 0, 0, K1in) is converted into an output achromatic color value set B2 in (0, 0, 0, K2out) only when the K1in value is in the black-print maintaining range. It is possible to prevent the input achromatic color value set B1in from being converted into an output achromatic color value set B2 in when the K1in value is in the CMY-print maintaining range, where graininess is expected to appear noticeable if black ink dots were mixed with other chromatic ink dots. It is possible to prevent an output image from suffering from graininess.

Modification of the Third Embodiment

In the third embodiment, both the lower limit L and the upper limit U are determined by actually printing print samples. However, only the upper limit U may be determined by actually printing print samples. The lower limit L may be set to any value as long as the lower limit L is smaller than the maximum value (255) and is greater than the upper limit U. The CMY-and-K print range is defined between the upper limit U and the lower limit L.

Also according to this modification, the black print maintaining range can be set as different from the CMY print maintaining range where graininess is expected to appear noticeable. The original lookup table LUT0 is modified in S9 so that a black print will be ma inta ined only for the black-print maintaining range in which graininess is not expected to appear noticeable.

It is noted that in the present modification, in S9, the original lookup table LUT0 may be modified into the lookup table LUT1 only for the black print maintaining range similarly to the second embodiment. In this case, the original lookup table LUT0 is not modified for the CM-and-K print range. Accordingly, the correspondences between achromatic color value sets B1a (0, 0, 0, K1) and color value sets B2 (C2, M2, Y2, K2) for the CMY-and-K print range in the lookup table LUT1 will be the same as the correspondences between achromatic color value sets B1a (0, 0, 0, K1) and color value sets B2 (C2, M2, Y2, K2) for the same range in the original lookup table LUT0.

Fourth Embodiment

Next will be described a fourth embodiment of the color conversion device with reference to FIGS. 8-10.

The color conversion device 1 of the present embodiment has the same configuration as that (FIG. 1) of the first, second, and third embodiments. However, the color conversion device 1 of the present embodiment executes a device link processing of FIG. 8, and executes the color conversion process of FIG. 10.

Figure 8:
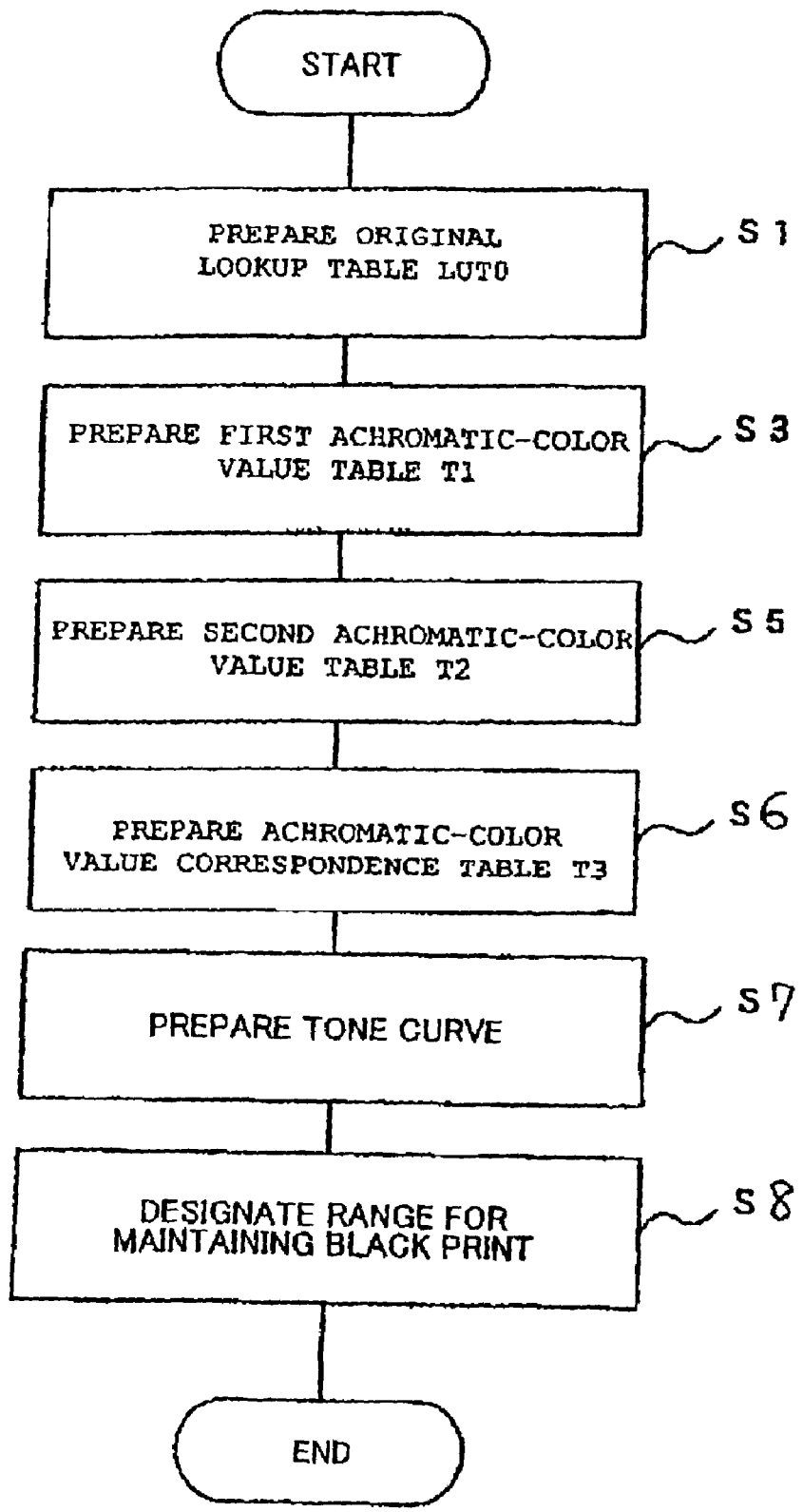
FIG. 8 is a flowchart of a device link processing executed according to a fourth embodiment.

As shown in FIG. 8, the device link processing according to the present embodiment is different from that of the second embodiment (FIG. 5) in that the process of S1 is modified, that the process of S9 is eliminated, and that a process of S7 is added between S6 and S8.

According to the present embodiment, the original lookup table LUT0 is not updated, but will be used as it is during the color conversion processing of FIG. 10. Accordingly, in S1, the original lookup table LUT0 shown in FIG. 3(a) may be stored in the hard disk 14 instead of being stored in the RAM 15.

Figure 9:
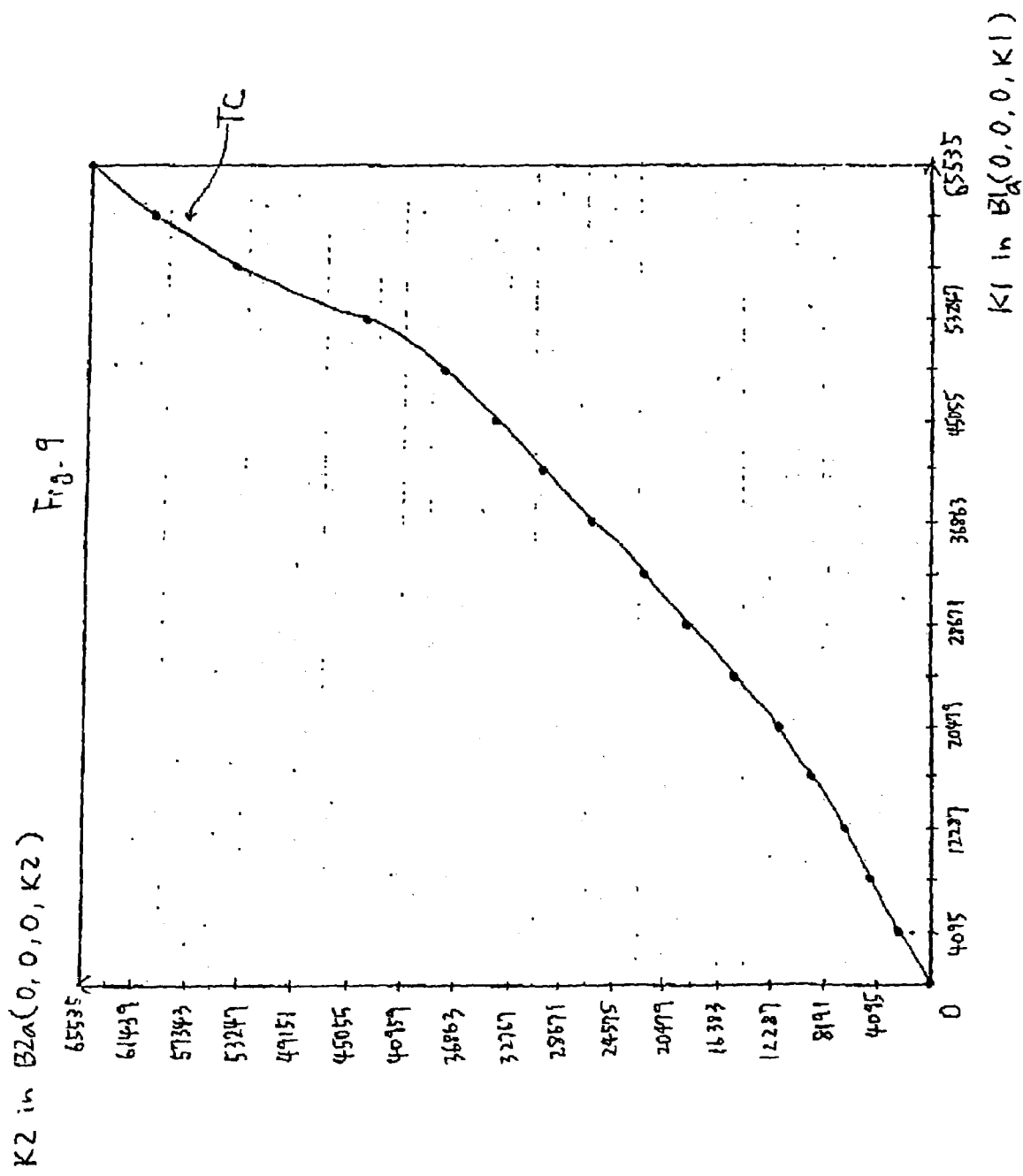
FIG. 9 shows a tone curve prepared during the device link processing of FIG. 8.

In S7, the CPU 11 creates a tone curve TC as shown in FIG. 9 based on the achromatic-color value correspondence table T3. In the graph of FIG. 9, the horizontal axis denotes the values of the black-control signals K1 in the seventeen achromatic color value sets B1a (0, 0, 0, K1) listed in the left column of the table T3, while the vertical axis denotes the values of the black-control signals K2 in the seventeen achromatic color value sets B2a (0, 0, 0, K2) listed in the right column of the table T3. The CPU 11 creates the tone curve TC by: first plotting seventeen points that are indicative of the relationship between the seventeen achromatic color value sets B1a (0, 0, 0, K1) and the seventeen achromatic color value sets B2a (0, 0, 0, K2) listed in the table T3 ; and then by connecting the seventeen plots by using an interpolation method. The thus created tone curve TC indicates how each of all the 65,536 number of achromatic color value sets B1a (0, 0, 0, K1) wherein K1 is 0, 1, 2, . . . , 65534, and 65535, should be converted into an achromatic color value set B2a (0, 0, 0, K2). The CPU 11 stores data of the tone curve TC in the RAM 15 or the hard disk 14.

It is noted that in S8, the black-print maintaining range is set in the same manner as in the second embodiment. More specifically, the black print maintaining range is set to extend from the predetermined maximum value (255) for all the black control signals Kin receivable in S31 during the color conversion processing of FIG. 10 to the lower limit L The lower limit L is smaller than the predetermined maximum value (255) by an amount greater than or equal to (1) so that at least two successive black control signals K1in of (254) and (255) can fall within the black print maintaining range.

Alternatively, the lower limit L of the black-print maintaining range may be set in the same manner as in the third embodiment and the modification of the third embodiment so that the lower limit L will be greater than the upper limit U of the CMY print maintaining range where graininess is expected to occur.

The color conversion process according to the present embodiment is different from that of the first embodiment (FIG. 4) in that the color conversion process of S32 is replaced with processes of S33, S35, S37, and S39.

In S33, the CPU 11 judges whether or not the black-control signal value K1in in the input color value set B1in (C1in, M1in, Y1in, K1in) is within the black print maintenance range, which has been set in S8 during the device link processing (FIG. 8).

If the black-control signal value K1in is out of the black print maintenance range (no in S33), the program proceeds to S37. On the other hand, if the black-control signal value K1in is within the black print maintenance range (yes in S33), the program proceeds to S35.

In S35, the CPU 11 judges whether or not the input color value set B1in (C1in, M1in, Y1in, K1in) is an achromatic color value set B1in (0, 0, 0, K1in) by judging whether or not the values C1in, M1in, Y1in of all the cyan-, magenta-, and yellow-control signals are zero (0).

If the CPU 11 determines that the input color value set B1in (C1in, M1in, Y1in, K1in) is an achromatic color value set B1in (0, 0, 0, K1in) because the values C1in, M1in, Y1in of all the cyan-, magenta-, and yellow-control signals are zero (0) (yes in S35), the program proceeds to S39.

On the other hand, if the CPU 11 determines that the input color value set B1in (C1in, M1in, Y1in, K1in) is not an achromatic color value set B1in (0, 0, 0, K1in) because at least one of the values C1in, M1in, Y1in of the cyan-, magenta-, and yellow-control signals is not zero (0) (no in S35), the program proceeds to S37.

In S37, the CPU 11 converts the input color value set B1in (C1in, M1in, Y1in, K1in) into an output color value set B2out (C2out, M2out, Y2out, K2out) by using the original lookup table LUT0 of FIG. 3(a) and by using the interpolation calculation in the same manner as in S32 of the first embodiment.

In S39, the CPU 11 converts the input color value set B1in (C1in, M1in, Y1in, K1in) (in this case, (0, 0, 0, K1in)) into an output achromatic color value set B2out (0, 0, 0, K2out) by using the tone curve TC of FIG. 9.

In this way, the CPU 11 converts the input achromatic color value set B1in (0, 0, 0, K1in), whose K1in value is within the black print maintaining range, into an output achromatic color value set B2out (0, 0, 0, K2out) by using the tone curve TC of FIG. 9. In this way, it is ensured that any input achromatic color value sets B1in (0, 0, 0, K1in), whose black-control signal value K1in are within the black print maintaining range, will be converted into achromatic color value sets B2out (0, 0, 0, K2out) by using the tone curve TC of FIG. 9 and that any other input color value sets B1in (C1in, M1in, Y1in, K1in) are converted into output color value sets B2out (C2out, M2out, Y2out, K2out) by using the original lookup table LUT0.

As described above, according to the present embodiment, the judgment processes of S33 and S35 are used to switch between: the conversion process of S39 for converting the range-falling input achromatic color value sets B1ain into output achromatic color value sets B2aout by using the tone curve TC; and the conversion process of S37 for converting the color value sets B1in other than the range-falling achromatic color value sets B1ain into color value sets B2out by using the original lookup table LUT0. Therefore, a black print can be maintained for a pixel for which the black print should be maintained, and color reproducibility can be maintained for other pixels.

<Modifications>

The judging process of S33 may not be executed. In this case, all the input achromatic color value sets (0, 0, 0, K1in) are converted into output achromatic color value sets (0, 0, 0, K2out) by using the tone curve TC.

In the above description, the tone curve TC is created to show correspondences between all the 65,536 number of black values K1 and their corresponding black values K2. However, the tone curve TC may be created to show correspondences between only the seventeen number of black values K1 and their corresponding black values K2 that are listed in the achromatic-color value correspondence table T3. In this case, in S39, the output black value K2out is calculated based on the input black value K1in by interpolating the K2 values on the tone curve TC.

While the invention has been described in detail with reference to the specific embodiments thereof, it would be apparent to those skilled in the art that various changes and modifications may be made therein without departing from the spirit of the invention.

For example, in the above-described embodiments, the printers A1 and A2 use ink of the four colors of cyan, magenta, yellow, and black. However, the printers A1 and A2 may use ink of more than four colors, such as light cyan, normal cyan, light magenta, normal magenta, yellow, and black.

In the above-described embodiments, the printers A1 and A2 are ink jet printers. However, the printers A1 and A2 may be: laser printers that form color images by using toner, thermal transfer printers, sublimation printers, and the like.

In the above-described embodiments, the Lab standard color value sets (L, a, b) are used as indicative of the color states. However, any other standard color value sets, such as XYZ color value sets (X, Y, Z), that are defined by the CIE can be used.

According to the above-described embodiments, the color conversion device 1 can receive color value sets B1 (C1, M1, Y1, K1) whose values C1, M1, Y1, K1 are integers in the range of 0 to 255. The black print maintaining range is therefore set to ensure that at least two successive achromatic dark color value sets of (0, 0, 0, 255) and (0, 0, 0, 254) can be converted into two successive achromatic dark color value sets of (0, 0, 0, K), in order to appropriately reproduce an achromatic dark gradation image. For example, the black print maintaining range for the value K1 is set to extend from the maximum value of 255 to the lower limit L that is smaller than the maximum value of 255 by one (1). However, the color conversion device 1 may be modified to receive such color value sets B1 (C1, M1, Y1, K1) whose values C1, M1, Y1, K1 are not only integers but also other values between adjacent integers. In such a case, the black print maintaining range may be set to extend from the maximum value of 255 to the lower limit L that is smaller than the maximum value of 255 by an amount that is smaller than one (1) so long as at least two successive achromatic dark color value sets, including the darkest color value set, can be included in the black print maintaining range and therefore can be converted into two successive achromatic dark color value sets of (0, 0, 0, K).

What is claimed is:

1. A color conversion device for converting an input color value set B1in to be used for controlling a device A1 into an output color value set B2out to be used for controlling another device A2, the color conversion device comprising:

a profile-storing portion storing profile data PF1 for a device A1 and profile data PF2 for another device A2;

an original lookup table creating portion creating an original lookup table T0 by determining standard color value sets D1 for a plurality of first color value sets B1 based on the profile data PF1, determining second color value sets B2 for the plurality of standard color value sets D1 based on the profile data PF2, and setting correspondences between the plurality of first color value sets B1 and the plurality of second color value sets B2, each first color value set B1 including one achromatic control signal having a value for controlling the device A1 to use one achromatic color with a corresponding amount and at least one chromatic control signal each having a corresponding value for controlling the device A1 to use a corresponding chromatic color with a corresponding amount, each second color value set B2 including one achromatic control signal having a value for controlling the device A2 to use one achromatic color with a corresponding amount and at least one chromatic control signal each having a corresponding value for controlling the device A2 to use a corresponding chromatic color with a corresponding amount, the plurality of first color value sets B1 including several first achromatic color value sets B1a, all of the at least one chromatic control signal in each first achromatic color value set B1a having a value of zero to control the device A1 to fail to use the at least one chromatic color;

a first achromatic-color value table creating portion creating a first achromatic-color value table T1 by determining standard color value sets D1 for the several first achromatic color value sets B1a based on the profile data PF1 and setting correspondences between the first achromatic color value sets B1a and the standard color value sets D1;

a second achromatic-color value table creating portion creating a second achromatic-color value table T2 by determining standard color value sets D2 for a plurality of second achromatic color value sets B2a based on the profile data PF2 and setting correspondences between the second achromatic color value sets B2a and the standard color value sets D2, all the at least one chromatic control signal constituting each second achromatic color value set B2a having a value of zero to control the device A2 to fail to use the at least one chromatic color;

an achromatic-color value correspondence table preparing unit preparing an achromatic-color value correspondence table T3 by extracting, for each first achromatic color value set B1a in the first achromatic-color value table T1, one second achromatic color value set B2a from the second achromatic-color value table T2, and setting a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2;

an input portion receiving an input color value set B1in to be used for controlling the device A1, the input color value set B1in including one achromatic control signal having a value for controlling the device A1 to use one achromatic color with a corresponding amount and at least one chromatic control signal each having a corresponding value for controlling the device A1 to use a corresponding chromatic color with a corresponding amount; and a color conversion portion converting the input color value set B1in into an output color value set B2out by using data of either one of the original lookup table T0 and the achromatic-color value correspondence table T3 that is selected depending on the value of the achromatic control signal in the input color value set B1in when all of the at least one chromatic control signal in the input color value set B1in has a value of zero, the output color value set B2out being used for controlling the device A2, the output color value set B2out including one achromatic control signal having a value for controlling the device A2 to use one achromatic color with a corresponding amount and at least one chromatic control signal each having a corresponding value for controlling the device A2 to use a corresponding chromatic color with a corresponding amount.

2. A color conversion device as claimed in claim 1, wherein each standard color value set D1 includes a lightness value L1, and each standard color value set D2 includes a lightness value L2, and wherein the lightness value L2 in the standard color value set D2 for the extracted second achromatic color value set B2a is the closest to the lightness value L1 in the standard color value set D1 for the subject first achromatic color value set B1a among the lightness values L2 in all the standard color value sets D2 in the second achromatic-color value table T2.

3. A color conversion device as claimed in claim 1, wherein the color conversion portion includes:

a modifying portion modifying the original lookup table T0 into a modified lookup table T1 by replacing the second color value set B2, which is set in the original lookup table T0 for each of at least a part of the several first achromatic color value sets B1a, with the second achromatic color value set B2a, which is set in the achromatic color-value correspondence table T3 in correspondence with the subject first achromatic color value set B1a; and a modified-table conversion portion converting the input color value set B1in into the output color value set B2out by using the modified original lookup table T0.

4. A color conversion device as claimed in claim 3, wherein the color conversion portion further includes a range setting portion previously setting an achromatic range, and wherein the modifying portion executes the replacing operation onto a second color value set B2 which is set in the original lookup table T0 for each first achromatic color value set B1a whose constituent achromatic control signal has a value within the achromatic range.

5. A color conversion device as claimed in claim 1, wherein when all of the at least one chromatic control signal in the input color value set B1in has a value of zero, the color conversion portion converts the input color value set B1in into an output color value set B2out by using data of the original lookup table T0 when the value of the achromatic control signal in the input color value set B1in is in an achromatic range, and by using data of the achromatic-color value correspondence table T3 when the value of the achromatic control signal in the input color value set B1in is in a range other than the achromatic range.

6. A color conversion device as claimed in claim 5, wherein the achromatic range extends from a predetermined maximum value for the achromatic control signals to a threshold that is smaller than the predetermined maximum value by such an amount that each of the original lookup table T0 and the achromatic-color value correspondence table T3 stores therein at least two successive achromatic color value sets B1a, whose achromatic control signals have two successive values falling in the achromatic range.

7. A color conversion device for converting an input color value set B1in to be used for controlling a device A1 into an output color value set B2out to be used for controlling another device A2, the color conversion device comprising:

a profile-storing portion storing profile data PF1 for a device A1 and profile data PF2 for another device A2:

an original lookup table creating portion creating an original lookup table T0 by determining standard color value sets D1 for a plurality of first color value sets B1 based on the profile data PF1, determining second color value sets B2 for the plurality of standard color value sets D1 based on the profile data PF2, and setting correspondences between the plurality of first color value sets B1 and the plurality of second color value sets B2, each first color value set B1 including one achromatic control signal having a value for controlling the device A1 to use one achromatic color with a corresponding amount and at least one chromatic control signal each having a corresponding value for controlling the device A1 to use a corresponding chromatic color with a corresponding amount, each second color value set B2 including one achromatic control signal having a value for controlling the device A2 to use one achromatic color with a corresponding amount and at least one chromatic control signal each having a corresponding value for controlling the device A2 to use a corresponding chromatic color with a corresponding amount, the plurality of first color value sets B1 including several first achromatic color value sets B1a, all of the at least one chromatic control signal in each first achromatic color value set B1a having a value of zero to control the device A1 to fail to use the at least one chromatic color:

a first achromatic-color value table creating portion creating a first achromatic-color value table T1 by determining standard color value sets D1 for the several first achromatic color value sets B1a based on the profile data PF1 and setting correspondences between the first achromatic color value sets B1a and the standard color value sets D1;

a second achromatic-color value table creating portion creating a second achromatic-color value Table T2 by determining standard color value sets D2 for a plurality of second achromatic color value sets B2a based on the profile data PF2 and setting correspondences between the second achromatic color value sets B2a and the standard color value sets D2, all the at least one chromatic control signal constituting in each second achromatic color value set B2a having a value of zero to control the device A2 to fail to use the at least one chromatic color;

an achromatic-color value correspondence table preparing unit preparing an achromatic-color value correspondence table T3 by extracting, for each first achromatic color value set B1a in the first achromatic-color value table T1, one second achromatic color value set B2a from the second achromatic-color value table T2, and setting a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2;

an input portion receiving an input color value set B1in to be used for controlling the device A1, the input color value set B1in including one achromatic control signal having a value for controlling the device A1 to use one achromatic color with a corresponding amount and at least one chromatic control signal each having a corresponding value for controlling the device A1 to use corresponding a chromatic color with a corresponding amount; and a color conversion portion converting the input color value set B1in into an output color value set B2out by using the original lookup table T0 and the achromatic-color value correspondence table T3, the output color value set B2out being used for controlling the device A2, the output color value set B2out including one achromatic control signal having a value for controlling the device A2 to use one achromatic color with a corresponding amount and at least one chromatic control signal each having a corresponding value for controlling the device A2 to use a corresponding chromatic color with a corresponding amount;

wherein the color conversion portion includes:

a modifying portion modifying the original lookup table T0 into a modified lookup table T1 by replacing the second color value set B2, which is set in the original lookup table T0 for each of at least a part of the several first achromatic color value sets B1a, with the second achromatic color value set B2a, which is set in the achromatic color-value correspondence table T3 in correspondence with the subject first achromatic color value set B1a;

a modified-table conversion portion converting the input color value set B1in into the output color value set B2out by using the modified original lookup table T0; and a range setting portion previously setting an achromatic range;

wherein the modifying portion executes the replacing operation onto a second color value set B2 which is set in the original lookup table T0 for each first achromatic color value set B1a whose constituent achromatic control signal has a value within the achromatic range, and wherein the range setting portion sets the achromatic range that extends from a predetermined maximum value for the achromatic control signals to a threshold that is smaller than the predetermined maximum value by such an amount that each of the original lookup table LUT0 and the achromatic-color value correspondence table T3 stores therein at least two successive achromatic color value sets B1a, whose achromatic control signals have two successive values falling in the achromatic range.

8. A color conversion device for converting an input color value set B1in to be used for controlling a device A1 into an output color value set B2out to be used for controlling another device A2, the color conversion device comprising:

a profile-storing portion storing profile data PF1 for a device A1 and profile data PF2 for another device A2;

an original lookup table creating portion creating an original lookup table T0 by determining standard color value sets D1 for a plurality of first color value sets B1 based on the profile data PF1, determining second color value sets B2 for the plurality of standard color value sets D1 based on the profile data PF2, and setting correspondences between the plurality of first color value sets B1 and the plurality of second color value sets B2, each first color value set B1 including one achromatic control signal having a value for controlling the device A1 to use one achromatic color with a corresponding amount and at least one chromatic control signal each having a corresponding value for controlling the device A1 to use a corresponding chromatic color with a corresponding amount, each second color value set B2 including one achromatic control signal having a value for controlling the device A2 to use one achromatic color with a corresponding amount and at least one chromatic control signal each having a corresponding value for controlling the device A2 to use a corresponding chromatic color with a corresponding amount, the plurality of first color value sets B1 including several first achromatic color value sets B1a, all of the at least one chromatic control signal in each first achromatic color value set B1a having a value of zero to control the device A1 to fail to use the at least one chromatic color;

a first achromatic-color value table creating portion creating a first achromatic-color value table T1 by determining standard color value sets D1 for the several first achromatic color value sets B1a based on the profile data PF1 and setting correspondences between the first achromatic color value sets B1a and the standard color value sets D1;

a second achromatic-color value table creating portion creating a second achromatic-color value Table T2 by determining standard color value sets D2 for a plurality of second achromatic color value sets B2a based on the profile data PF2 and setting correspondences between the second achromatic color value sets B2a and the standard color value sets D2, all the at least one chromatic control signal constituting in each second achromatic color value set B2a having a value of zero to control the device A2 to fail to use the at least one chromatic color;

an achromatic-color value correspondence table preparing unit preparing an achromatic-color value correspondence table T3 by extracting, for each first achromatic color value set B1a in the first achromatic-color value table T1, one second achromatic color value set B2a from the second achromatic-color value table T2, and setting a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2;

an input portion receiving an input color value set B1in to be used for controlling the device A1, the input color value set B1in including one achromatic control signal having a value for controlling the device A1 to use one achromatic color with a corresponding amount and at least one chromatic control signal each having a corresponding value for controlling the device A1 to use a corresponding chromatic color with a corresponding amount; and a color conversion portion converting the input color value set B1in into an output color value set B2out by using the original lookup table T0 and the achromatic-color value correspondence table T3, the output color value set B2out being used for controlling the device A2, the output color value set B2out including one achromatic control signal having a value for controlling the device A2 to use one achromatic color with a corresponding amount and at least one chromatic control signal each having a corresponding value for controlling the device A2 to use a corresponding chromatic color with a corresponding amount;

wherein the color conversion portion includes:

a modifying portion modifying the original lookup table T0 into a modified lookup table T1 by replacing the second color value set B2, which is set in the original lookup table T0 for each of at least a part of the several first achromatic color value sets B1a, with the second achromatic color value set B2a, which is set in the achromatic color-value correspondence table T3 in correspondence with the subject first achromatic color value set B1a;

a modified-table conversion portion converting the input color value set B1in into the output color value set B2out by using the modified original lookup table T0; and a range setting portion previously setting an achromatic range;

wherein the modifying portion executes the replacing operation onto a second color value set B2 which is set in the original lookup table T0 for each first achromatic color value set B1a whose constituent achromatic control signal has a value within the achromatic range;

wherein the range setting portion further sets a chromatic range and a chromatic-and-achromatic range, wherein the modifying portion fails to execute the replacing operation onto a second color value set B2 which is set in the original lookup table T0 for each first achromatic color value set B1a whose constituent achromatic control signal has a value within the chromatic range, and wherein the modifying portion modifies, based on the achromatic-color value correspondence table T3 and the original lookup table, a second color value set B2, which is set in the original lookup table T0 for each first achromatic color value set B1a whose constituent achromatic control signal has a value within the chromatic-and-achromatic range.

9. A color conversion device as claimed in claim 8, wherein the achromatic range extends from a predetermined maximum value for the achromatic control signals to a lower limit smaller than the maximum value, the chromatic range extending from a predetermined minimum value for the achromatic control signals to an upper limit greater than the minimum value and smaller than the lower limit, the chromatic-and-achromatic range extending between the upper limit and the lower limit, the upper limit being a smallest value in several achromatic control signals that cause the printer A2 to reproduce no graininess, the lower limit being a smallest value in other achromatic control signals that cause the printer A2 to reproduce densities greater than the at least one chromatic control signal having a predetermined maximum value in the chromatic control signals.

10. A color conversion device for converting an input color value set B1in to be used for controlling a device A1 into an output color value set B2out to be used for controlling another device A2, the color conversion device comprising:

a profile-storing portion storing profile data PF1 for a device A1 and profile data PF2 for another device A2;

an original lookup table creating portion creating an original lookup table T0 by determining standard color value sets D1 for a plurality of first color value sets B1 based on the profile data PF1, determining second color value sets B2 for the plurality of standard color value sets D1 based on the profile data PF2, and setting correspondences between the plurality of first color value sets B1 and the plurality of second color value sets B2, each first color value set B1 including one achromatic control signal having a value for controlling the device A1 to use one achromatic color with a corresponding amount and at least one chromatic control signal each having a corresponding value for controlling the device A1 to use a corresponding chromatic color with a corresponding amount, each second color value set B2 including one achromatic control signal having a value for controlling the device A2 to use one achromatic color with a corresponding amount and at least one chromatic control signal each having a corresponding value for controlling the device A2 to use a corresponding chromatic color with a corresponding amount, the plurality of first color value sets B1 including several first achromatic color value sets B1a, all of the at least one chromatic control signal in each first achromatic color value set B1a having a value of zero to control the device A1 to fail to use the at least one chromatic color;

a first achromatic-color value table creating portion creating a first achromatic-color value table T1 by determining standard color value sets D1 for the several first achromatic color value sets B1a based on the profile data PF1 and setting correspondences between the first achromatic color value sets B1a and the standard color value sets D1;

a second achromatic-color value table creating portion creating a second achromatic-color value Table T2 by determining standard color value sets D2 for a plurality of second achromatic color value sets B2a based on the profile data PF2 and setting correspondences between the second achromatic color value sets B2a and the standard color value sets D2, all the at least one chromatic control signal constituting in each second achromatic color value set B2a having a value of zero to control the device A2 to fail to use the at least one chromatic color;

an achromatic-color value correspondence table preparing unit preparing an achromatic-color value correspondence table T3 by extracting, for each first achromatic color value set B1a in the first achromatic-color value table T1, one second achromatic color value set B2a from the second achromatic-color value table T2, and setting a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2;

an input portion receiving an input color value set B1in to be used for controlling the device A1, the input color value set B1in including one achromatic control signal having a value for controlling the device A1 to use one achromatic color with a corresponding amount and at least one chromatic control signal each having a corresponding value for controlling the device A1 to use a corresponding chromatic color with a corresponding amount; and a color conversion portion converting the input color value set B1in into an output color value set B2out by using the original lookup table T0 and the achromatic-color value correspondence table T3, the output color value set B2out being used for controlling the device A2, the output color value set B2out including one achromatic control signal having a value for controlling the device A2 to use one achromatic color with a corresponding amount and at least one chromatic control signal each having a corresponding value for controlling the device A2 to use a corresponding chromatic color with a corresponding amount;

wherein the color conversion portion includes:

a tone-curve creating portion creating a tone curve indicative of all the correspondences between the first achromatic color value sets B1a and the second achromatic color value sets B2a set in the achromatic-color value correspondence table T3;

an achromatic-judging portion judging whether or not the input color value set B1in is an input achromatic color value set B1in whose constituent at least one chromatic control signal has a value of zero;

a first conversion portion converting the input color value set B1in into the output color value set B2out by using the original lookup table T0 when the input color value set B1in is not an input achromatic color value set B1in; and a second conversion portion converting the input color value set B1in into the output color value set B2out by using the tone curve when the input color value set B1in is the input achromatic color value set B1in.

11. A color conversion device as claimed in claim 10, wherein the color conversion portion further includes a range setting portion previously setting an achromatic range, wherein the achromatic-judging portion judges whether or not the input color value set B1in is an input range-falling achromatic color value set B1in whose constituent at least one chromatic control signal has a value of zero and whose constituent achromatic control signal has a value within the achromatic range, wherein the first conversion portion converts, the input color value set B1in into the output color value set B2out by using the original lookup table T0 when the input color value set B1in is not an input range-falling achromatic color value set B1in, wherein the second conversion portion converts the input color value set B1in into the output color value set B2out by using the tone curve when the input color value set B1in is the input range-falling achromatic color value set B1in.

12. A color conversion device as claimed in claim 11, wherein the range setting portion sets the achromatic range that extends from a predetermined maximum value for the achromatic control signals receivable by the input portion to a threshold that is smaller than the predetermined maximum value by such an amount that the input portion is capable of receiving at least two input range-falling achromatic color value sets B1in, whose achromatic control signals have two successive values falling in the achromatic range.

13. A table creating device for creating an achromatic color conversion table for converting an input achromatic color value set B1in, to be used for controlling a device A1 to reproduce an achromatic color, into an output achromatic color value set B2out to be used for controlling another device A2 to reproduce substantially the same achromatic color, the table creating device comprising:

a first achromatic-color value table creating portion creating a first achromatic-color value table T1 by determining standard color value sets D1 for several first achromatic color value sets B1a, and determining a correspondence between the first achromatic color value sets B1a and the standard color value sets D1, each first achromatic color value set B1a including one achromatic control signal having a value for controlling the device A1 to use one achromatic color with a corresponding amount and a chromatic control signal having a value of zero for controlling the device A1 to fail to use the chromatic color;

a second achromatic-color value table creating portion creating a second achromatic-color value table T2 by determining standard color value sets D2 for a plurality of second achromatic color value sets B2a, and determining a correspondence between the second achromatic color value sets B2a and the standard color value sets D2, each second achromatic color value set B2a including one achromatic control signal having a value for controlling the device A2 to use one achromatic color with a corresponding amount and a chromatic control signal having a value of zero for controlling the device A2 to fail to use the chromatic color;

an achromatic color conversion table preparing unit preparing an achromatic color conversion table T3 by extracting, for each first achromatic color value set B1a in the first achromatic-color value table T1, one second achromatic color value set B2a from the second achromatic-color value table T2, and determining a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2; and a recording portion recording at least a part of the achromatic color conversion table in a memory, wherein the several achromatic color value sets B1a include: a darkest first achromatic color value set B1a whose constituent achromatic control signal has a predetermined maximum value; and a second darkest first achromatic color value set B1a whose constituent achromatic control signal has a predetermined second maximum value, and wherein the recording portion extracts, from the achromatic color conversion table, at least a correspondence between the darkest first achromatic color value set B1a and its corresponding second achromatic color value set B2a and another correspondence between the second darkest first achromatic color value set B1a and its corresponding second achromatic color value set B2a, the recording portion recording the extracted at least two correspondence in the memory.

14. A table creating device as recited in claim 13, wherein each standard color value set D1 includes a lightness value L1, and each standard color value set D2 includes a lightness value L2, and wherein the lightness value L2 in the standard color value set D2 for the extracted second achromatic color value set B2a is the closest to the lightness value L1 in the standard color value set D1 for the subject first achromatic color value set B1a among the lightness values L2 in all the standard color value sets D2 in the second achromatic-color value table T2.

15. A table creating device as recited in claim 13, further comprising a range setting portion previously setting an achromatic range, wherein the recording portion extracts, from the achromatic color conversion table, a correspondence between each first achromatic color value set B1a, whose achromatic control signal has a value within the achromatic range, and its corresponding second achromatic color value set B2a, the recording portion recording the extracted correspondence in the memory.

16. A table creating device as recited in claim 13, wherein the recording portion extracts, from the achromatic color conversion table, the correspondences between all the several first achromatic color value sets B1a and their corresponding second achromatic color value sets B2a, and records the extracted correspondences in the form of a tone curve in the memory.

17. A color conversion device for converting an input color value set B1in, to be used for controlling a device A1, into an output color value set B2out to be used for controlling another device A2, the color conversion device comprising:

an input portion receiving an input color value set B1in to be used for controlling the device A1 to reproduce a color, the input color value set B1in including one achromatic control signal having a value for controlling the device A1 to use one achromatic color with a corresponding amount and at least one chromatic control signal each having a corresponding value for controlling the device A1 to use a corresponding chromatic color with a corresponding amount, a predetermined achromatic range extending from a predetermined maximum value for the achromatic control signals of the input color value sets B1in receivable by the input portion to a threshold smaller than the predetermined maximum value by such an amount that the input portion is capable of receiving at least two range-falling achromatic color value sets whose constituent chromatic control signals have values of zero and whose constituent achromatic control signals have two successive values within the predetermined achromatic range, the predetermined maximum value indicating a darkest achromatic state; and a color conversion portion converting the input color value set B1in into an output color value set B2out to be used for controlling another device A2 to reproduce substantially the same color as reproduced by the device A1 by the input color value set B1in, the output color value set B2out including one achromatic control signal having a value for controlling the device A2 to use one achromatic color with a corresponding amount and at least one chromatic control signal each having a corresponding value for controlling the device A2 to use a corresponding chromatic color with a corresponding amount, the color conversion portion including an achromatic conversion portion converting each range-falling achromatic color value set B1in into an achromatic color value set B2out whose constituent at least one chromatic control signal has a value of zero.

18. A color conversion program stored as computer-executable instructions on a computer-readable medium for converting an input color value set B1in to be used for controlling a device A1 into an output color value set B2out to be used for controlling another device A2, the color conversion program comprising:

an original lookup table creating program creating an original lookup table T0 by determining standard color value sets D1 for a plurality of first color value sets B1 based on profile data PF1 for a device A1, determining second color value sets B2 for the plurality of standard color value sets D1 based on profile data PF2 for another device A2, and setting correspondences between the plurality of first color value sets B1 and the plurality of second color value sets B2, each first color value set B1 including one achromatic control signal having a value for controlling the device A1 to use one achromatic color with a corresponding amount and at least one chromatic control signal each having a corresponding value for controlling the device A1 to use a corresponding chromatic color with a corresponding amount, each second color value set B2 including one achromatic control signal having a value for controlling the device A2 to use one achromatic color with a corresponding amount and at least one chromatic control signal each having a corresponding value for controlling the device A2 to use a corresponding chromatic color with a corresponding amount, the plurality of first color value sets B1 including several first achromatic color value sets B1a, all of the at least one chromatic control signal in each first achromatic color value set B1a having a value of zero to control the device A1 to fail to use the at least one chromatic color;

a first achromatic-color value table creating program creating a first achromatic-color value table T1 by determining standard color value sets D1 for the several first achromatic color value sets B1a based on the profile data PF1 and setting correspondences between the first achromatic color value sets B1a and the standard color value sets D1;

a second achromatic-color value table creating program creating a second achromatic-color value table T2 by determining standard color value sets D2 for a plurality of second achromatic color value sets B2a based on the profile data PF2 and setting correspondences between the second achromatic color value sets B2a and the standard color value sets D2, all the at least one chromatic control signal constituting each second achromatic color value set B2a having a value of zero to control the device A2 to fail to use the at least one chromatic color;

an achromatic-color value correspondence table preparing program preparing an achromatic-color value correspondence table T3 by extracting, for each first achromatic color value set B1a in the first achromatic-color value table T1, one second achromatic color value set B2a from the second achromatic-color value table T2, and setting a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2;

an input program receiving an input color value set B1in to be used for controlling the device A1, the input color value set B1in including one achromatic control signal having a value for controlling the device A1 to use one achromatic color with a corresponding amount and at least one chromatic control signal each having a corresponding value for controlling the device A1 to use a corresponding chromatic color with a corresponding amount; and a color conversion program converting the input color value set B1in into an output color value set B2out by using data of either one of the original lookup table T0 and the achromatic-color value correspondence table T3 that is selected depending on the value of the achromatic control signal in the input color value set B1in when all of the at least one chromatic control signal in the input color value set B1in has a value of zero, the output color value set B2out being used for controlling the device A2, the output color value set B2out including one achromatic control signal having a value for controlling the device A2 to use one achromatic color with a corresponding amount and at least one chromatic control signal each having a corresponding value for controlling the device A2 to use a corresponding chromatic color with a corresponding amount.

19. A table creating program stored as computer-executable instructions on a computer-readable medium for creating an achromatic color conversion table for converting an input achromatic color value set B1a in, to be used for controlling a device A1 to reproduce an achromatic color, into an output achromatic color value set B2out to be used for controlling another device A2 to reproduce substantially the same achromatic color, the table creating program comprising:

a first achromatic-color value table creating program creating a first achromatic-color value table T1 by determining standard color value sets D1 for several first achromatic color value sets B1a, and determining a correspondence between the first achromatic color value sets B1a and the standard color value sets D1, each first achromatic color value set B1a including one achromatic control signal having a value for controlling the device A1 to use one achromatic color with a corresponding amount and a chromatic control signal having a value of zero for controlling the device A1 to fail to use the chromatic color;

a second achromatic-color value table creating program creating a second achromatic-color value table T2 by determining standard color value sets D2 for a plurality of second achromatic color value sets B2a, and determining a correspondence between the second achromatic color value sets B2a and the standard color value sets D2, each second achromatic color value set B2a including one achromatic control signal having a value for controlling the device A2 to use one achromatic color with a corresponding amount and a chromatic control signal having a value of zero for controlling the device A2 to fail to use the chromatic color;

an achromatic color conversion table preparing program preparing an achromatic color conversion table T3 by extracting, for each first achromatic color value set B1a in the first achromatic-color value table T1, one second achromatic color value set B2a from the second achromatic-color value table T2, and determining a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2; and a recording program recording at least a part of the achromatic color conversion table in a memory, wherein the several achromatic color value sets B1a include: a darkest first achromatic color value set B1a whose constituent achromatic control signal has a predetermined maximum value; and a second darkest first achromatic color value set B1a whose constituent achromatic control signal has a predetermined second maximum value, and wherein the recording program extracts, from the achromatic color conversion table, at least a correspondence between the darkest first achromatic color value set B1a and its corresponding second achromatic color value set B2a and another correspondence between the second darkest first achromatic color value set B1a and its corresponding second achromatic color value set B2a, the recording program recording the extracted at least two correspondences in the memory.

20. A color conversion program stored as computer-executable instructions on a computer-readable medium for converting an input color value set B1in, to be used for controlling a device A1, into an output color value set B2out to be used for controlling another device A2, the color conversion program comprising:

an input program receiving an input color value set B1in to be used for controlling the device A1 to reproduce a color, the input color value set B1in including one achromatic control signal having a value for controlling the device A1 to use one achromatic color with a corresponding amount and at least one chromatic control signal each having a corresponding value for controlling the device A1 to use a corresponding chromatic color with a corresponding amount, a predetermined achromatic range extending from a predetermined maximum value for the achromatic control signals of the input color value sets B1in receivable by the input program to a threshold smaller than the predetermined maximum value by such an amount that the input program is capable of receiving at least two range-falling achromatic color value sets whose constituent chromatic control signals have values of zero and whose constituent achromatic control signals have two successive values within the predetermined achromatic range, the predetermined maximum value indicating a darkest achromatic state; and a color conversion program converting the input color value set B1in into an output color value set B2out to be used for controlling another device A2 to reproduce substantially the same color as reproduced by the device A1 by the input color value set B1in, the output color value set B2out including one achromatic control signal having a value for controlling the device A2 to use one achromatic color with a corresponding amount and at least one chromatic control signal each having a corresponding value for controlling the device A2 to use a corresponding chromatic color with a corresponding amount, the color conversion program including an achromatic conversion program converting each range-falling achromatic color value set B1in into an achromatic color value set B2out whose constituent at least one chromatic control signal has a value of zero.

21. A computer-readable storage medium storing a computer-executable color conversion program for converting an input color value set B1in to be used for controlling a device A1 into an output color value set B2out to be used for controlling another device A2, the color conversion program comprising:

an original lookup table creating program creating an original lookup table T0 by determining standard color value sets D1 for a plurality of first color value sets B1 based on profile data PF1 for a device A1, determining second color value sets B2 for the plurality of standard color value sets D1 based on profile data PF2 for another device A2, and setting correspondences between the plurality of first color value sets B1 and the plurality of second color value sets B2, each first color value set B1 including one achromatic control signal having a value for controlling the device A1 to use one achromatic color with a corresponding amount and at least one chromatic control signal each having a corresponding value for controlling the device A1 to use a corresponding chromatic color with a corresponding amount, each second color value set B2 including one achromatic control signal having a value for controlling the device A2 to use one achromatic color with a corresponding amount and at least one chromatic control signal each having a corresponding value for controlling the device A2 to use a corresponding chromatic color with a corresponding amount, the plurality of first color value sets B1 including several first achromatic color value sets B1a, all of the at least one chromatic control signal in each first achromatic color value set B1a having a value of zero to control the device A1 to fail to use the at least one chromatic color;

a first achromatic-color value table creating program creating a first achromatic-color value table T1 by determining standard color value sets D1 for the several first achromatic color value sets B1a based on the profile data PF1 and setting correspondences between the first achromatic color value sets B1a and the standard color value sets D1;

a second achromatic-color value table creating program creating a second achromatic-color value table T2 by determining standard color value sets D2 for a plurality of second achromatic color value sets B2a based on the profile data PF2 and setting correspondences between the second achromatic color value sets B2a and the standard color value sets D2, all the at least one chromatic control signal constituting in each second achromatic color value set B2a having a value of zero to control the device A2 to fail to use the at least one chromatic color;

an achromatic-color value correspondence table preparing program preparing an achromatic-color value correspondence table T3 by extracting, for each first achromatic color value set B1a in the first achromatic-color value table T1, one second achromatic color value set B2a from the second achromatic-color value table T2, and setting a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2;

an input program receiving an input color value set B1in to be used for controlling the device A1, the input color value set B1in including one achromatic control signal having a value for controlling the device A1 to use one achromatic color with a corresponding amount and at least one chromatic control signal each having a corresponding value for controlling the device A1 to use a corresponding chromatic color with a corresponding amount; and a color conversion program converting the input color value set B1in into an output color value set B2out by using data of either one of the original lookup table T0 and the achromatic-color value correspondence table T3 that is selected depending on the value of the achromatic control signal in the input color value set B1in when all of the at least one chromatic control signal in the input color value set B1in has a value of zero, the output color value set B2out being used for controlling the device A2, the output color value set B2out including one achromatic control signal having a value for controlling the device A2 to use one achromatic color with a corresponding amount and at least one chromatic control signal each having a corresponding value for controlling the device A2 to use a corresponding chromatic color with a corresponding amount.

22. A computer-readable storage medium storing a computer-executable table creating program for creating an achromatic color conversion table for converting an input achromatic color value set B1a in, to be used for controlling a device A1 to reproduce an achromatic color, into an output achromatic color value set B2out to be used for controlling another device A2 to reproduce substantially the same achromatic color, the table creating program comprising:

a first achromatic-color value table creating program creating a first achromatic-color value table T1 by determining standard color value sets D1 for several first achromatic color value sets B1a, and determining a correspondence between the first achromatic color value sets B1a and the standard color value sets D1, each first achromatic color value set B1a including one achromatic control signal having a value for controlling the device A1 to use one achromatic color with a corresponding amount and a chromatic control signal having a value of zero for controlling the device A1 to fail to use the chromatic color;

a second achromatic-color value table creating program creating a second achromatic-color value table T2 by determining standard color value sets D2 for a plurality of second achromatic color value sets B2a, and determining a correspondence between the second achromatic color value sets B2a and the standard color value sets D2, each second achromatic color value set B2a including one achromatic control signal having a value for controlling the device A2 to use one achromatic color with a corresponding amount and a chromatic control signal having a value of zero for controlling the device A2 to fail to use the chromatic color;

an achromatic color conversion table preparing program preparing an achromatic color conversion table T3 by extracting, for each first achromatic color value set B1a in the first achromatic-color value table T1, one second achromatic color value set B2a from the second achromatic-color value table T2, and determining a correspondence between the subject first achromatic color value set B1a and the extracted second achromatic color value set B2a, the standard color value set D2 for the extracted second achromatic color value set B2a being the closest to the standard color value set D1 for the subject first achromatic color value set B1a among all the standard color value sets D2 in the second achromatic-color value table T2; and a recording program recording at least a part of the achromatic color conversion table in a memory, wherein the several achromatic color value sets B1a include: a darkest first achromatic color value set B1a whose constituent achromatic control signal has a predetermined maximum value; and a second darkest first achromatic color value set B1a whose constituent achromatic control signal has a predetermined second maximum value, and wherein the recording program extracts, from the achromatic color conversion table, at least a correspondence between the darkest first achromatic color value set B1a and its corresponding second achromatic color value set B2a and another correspondence between the second darkest first achromatic color value set B1a and its corresponding second achromatic color value set B2a, the recording program recording the extracted at least two correspondences in the memory.

23. A computer-readable storage medium storing a computer-executable color conversion program for converting an input color value set B1in, to be used for controlling a device A1, into an output color value set B2out to be used for controlling another device A2, the color conversion program comprising:

an input program receiving an input color value set B1in to be used for controlling the device A1 to reproduce a color, the input color value set B1in including one achromatic control signal having a value for controlling the device A1 to use one achromatic color with a corresponding amount and at least one chromatic control signal each having a corresponding value for controlling the device A1 to use a corresponding chromatic color with a corresponding amount, a predetermined achromatic range extending from a predetermined maximum value for the achromatic control signals of the input color value sets B1in receivable by the input program to a threshold smaller than the predetermined maximum value by such an amount that the input program is capable of receiving at least two range-falling achromatic color value sets whose constituent chromatic control signals have values of zero and whose constituent achromatic control signals have two successive values within the predetermined achromatic range, the predetermined maximum value indicating a darkest achromatic state; and a color conversion program converting the input color value set B1in into an output color value set B2out to be used for controlling another device A2 to reproduce substantially the same color as reproduced by the device A1 by the input color value set B1in, the output color value set B2out including one achromatic control signal having a value for controlling the device A2 to use one achromatic color with a corresponding amount and at least one chromatic control signal each having a corresponding value for controlling the device A2 to use a corresponding chromatic color with a corresponding amount, the color conversion program including an achromatic conversion program converting each range-falling achromatic color value set B1in into an achromatic color value set B2out whose constituent at least one chromatic control signal has a value of zero.

24. A table for being used for converting an input color value set, to be used for controlling a device A1 to reproduce a color, into an output color value set to be used for controlling another device A2 to reproduce substantially the same color, the table comprising:

data of a plurality of first color value sets B1 to be used for controlling a device A1 to reproduce a plurality of colors, each first color value set B1 including one achromatic control signal having a value for controlling the device A1 to use one achromatic color with a corresponding amount and at least one chromatic control signal each having a corresponding value for controlling the device A1 to use a corresponding chromatic color with a corresponding amount, the plurality of first color value sets B1 including several first achromatic color value sets B1a, all of the at least one chromatic control signal in each first color value set B1a having a value of zero to control the device A1 to fail to use the at least one chromatic color, the several first achromatic color value sets B1a including at least two successive range-falling achromatic color value sets B1a, whose achromatic control signals have two successive values falling in an achromatic range that extends from a predetermined maximum value for the achromatic control signals to a threshold that is smaller than the predetermined maximum value, the values of the achromatic control signals in the at least two successive achromatic color value sets B1a being greater than or equal to the threshold and smaller than or equal to the maximum value, the predetermined maximum value indicating a darkest achromatic state; and data of a plurality of second color value sets B2 to be used for controlling a device A2 to reproduce substantially the same colors as the plurality of colors reproduced by the device A1 according to the plurality of first color value sets B1, the data of the plurality of second color value sets B2 being one to one correspondence with data of the plurality of second color value sets B1, each second color value set B2 including one achromatic control signal having a value for controlling the device A2 to use one achromatic color with a corresponding amount and at least one chromatic control signal each having a corresponding value for controlling the device A2 to use a corresponding chromatic color with a corresponding amount, the plurality of second color value sets B2including at least two achromatic color value sets B2a that correspond to the at least two range-falling achromatic color value sets B1a, all of the at least one chromatic control signal in each second achromatic color value set B2a having a value of zero to control the device A2 to fail to use the at least one chromatic color.

* * * * *